United States Patent
Rauhala et al.

(10) Patent No.: US 11,907,888 B2
(45) Date of Patent: Feb. 20, 2024

(54) AERIAL VEHICLE AND COMPUTING DEVICE INTERACTION FOR VALIDATING AERIAL VEHICLE ACTIVITY

(71) Applicant: HERE Global B.V., Eindhoven (NL)

(72) Inventors: Petri Rauhala, Tampere (FI); Lauri Aarne Johannes Wirola, Tampere (FI); Mike Koivisto, Tampere (FI); Justin Eylander, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 357 days.

(21) Appl. No.: 17/247,791

(22) Filed: Dec. 23, 2020

(65) Prior Publication Data

US 2022/0198373 A1 Jun. 23, 2022

(51) Int. Cl.
| | |
|---|---|
| *G06Q 10/083* | (2023.01) |
| *H04B 7/185* | (2006.01) |
| *B64C 39/02* | (2023.01) |
| *H04L 9/32* | (2006.01) |
| *G08G 5/00* | (2006.01) |

(Continued)

(52) U.S. Cl.
CPC ......... *G06Q 10/083* (2013.01); *B64C 39/024* (2013.01); *G08G 5/0043* (2013.01); *H04B 7/18506* (2013.01); *H04L 9/3247* (2013.01); *B64U 10/13* (2023.01); *B64U 2101/60* (2023.01)

(58) Field of Classification Search
CPC .. G06Q 10/083; B64C 39/024; G08G 5/0043; H04B 7/18506; H04L 9/3247; B64U 10/13; B64U 2101/60
See application file for complete search history.

(56) References Cited

U.S. PATENT DOCUMENTS

| | | | |
|---|---|---|---|
| 9,680,644 B2 * | 6/2017 | Chen | H04L 9/3231 |
| 9,731,821 B2 | 8/2017 | Hoareau et al. | |
| 10,823,562 B1 | 11/2020 | Carnahan et al. | |

(Continued)

FOREIGN PATENT DOCUMENTS

EP  3207428 A1  8/2017

OTHER PUBLICATIONS

Mena Report, "United Kingdom: Thales launches ECOsystem UTM and joins forces with Unifly to facilitate drone use," London, Mar. 8, 2017.*

(Continued)

*Primary Examiner* — Nathan Erb
(74) *Attorney, Agent, or Firm* — ALSTON & BIRD LLP

(57) ABSTRACT

One or more processors obtain a first radio environment signature associated with an aerial vehicle (AV) and a second radio environment signature associated with a computing device. Responsive to determining that the first radio environment signature and the second radio environment signature satisfy a similarity criteria, the one or more processors generate a validation data object verifying one or more of (i) that a location of the AV substantially corresponds to a location of the computing device at a time associated with at least one of the first radio environment signature or the second radio environment signature, (ii) a AV delivery associated with the AV and the computing device, or (iii) a AV pickup associated with the AV and the computing device. The one or more processors store or provide validation information based on the validation data object.

18 Claims, 6 Drawing Sheets

(51) Int. Cl.
B64U 10/13 (2023.01)
B64U 101/60 (2023.01)

(56) References Cited

U.S. PATENT DOCUMENTS

| | | | |
|---|---|---|---|
| 11,107,235 B1 | 8/2021 | Connell et al. | |
| 11,215,986 B2 | 1/2022 | Chen et al. | |
| 11,277,740 B1* | 3/2022 | Subramanian | H04L 63/0853 |
| 2014/0257595 A1 | 9/2014 | Tillmann | |
| 2015/0081583 A1* | 3/2015 | Butler | H04W 4/025 |
| | | | 705/333 |
| 2017/0034749 A1* | 2/2017 | Chandramouli | H04W 36/0011 |
| 2017/0083645 A1 | 3/2017 | Miyakawa | |
| 2017/0116477 A1 | 4/2017 | Chen et al. | |
| 2017/0147976 A1* | 5/2017 | Koch | G06Q 10/0833 |
| 2017/0262789 A1* | 9/2017 | Zhang | G06Q 10/08 |
| 2017/0270805 A1 | 9/2017 | Parker et al. | |
| 2017/0300757 A1 | 10/2017 | Wolf | |
| 2018/0068416 A1 | 3/2018 | Chandra et al. | |
| 2019/0049949 A1 | 2/2019 | Moeller et al. | |
| 2019/0050648 A1 | 2/2019 | Stojanovic et al. | |
| 2019/0197292 A1 | 6/2019 | Abeywardena et al. | |
| 2020/0029013 A1 | 1/2020 | Stanard et al. | |
| 2020/0066142 A1 | 2/2020 | Fowe et al. | |
| 2020/0195938 A1 | 6/2020 | Beck et al. | |
| 2020/0201344 A1 | 6/2020 | Viswanathan | |
| 2020/0255163 A1 | 8/2020 | Janssen | |
| 2020/0409929 A1* | 12/2020 | Kodavarti | G06F 16/2365 |
| 2021/0132612 A1 | 5/2021 | Wang | |
| 2021/0201050 A1 | 7/2021 | Marschner et al. | |
| 2022/0038249 A1* | 2/2022 | Raghavan | H04L 5/0005 |
| 2022/0038644 A1 | 2/2022 | McAllister et al. | |
| 2022/0197893 A1 | 6/2022 | Rauhala et al. | |
| 2022/0207855 A1 | 6/2022 | Lu et al. | |
| 2022/0223050 A1 | 7/2022 | Kwon et al. | |
| 2022/0351526 A1 | 11/2022 | Bar Zvi et al. | |
| 2022/0368958 A1 | 11/2022 | Izutsu | |

OTHER PUBLICATIONS

Shang et al., "Vision-Model-Based Real-Time Localization of Unmanned Aerial Vehicle or Autonomous Structure Inspection under GPS-Denied Environment", ASCE International Conference on Computing in Civil Engineering 2019, (Jun. 17-19, 2019), 8 pages.

Wang et al., "Bandwidth-Efficient Live Video Analytics for Drones via Edge Computing", 2018 IEEE/ACM Symposium on Edge Computing (SEC), (Oct. 2018), 15 pages.

Alwateer et al., "Drone Services: Issues in Drones for Location-Based Services from Human-Drone Interaction to Information Processing", Journal of Location Based Services (Jan. 16, 2019), 36 pages.

Non-Final Office Action for U.S. Appl. No. 17/247,790 dated Dec. 15, 2022.

* cited by examiner

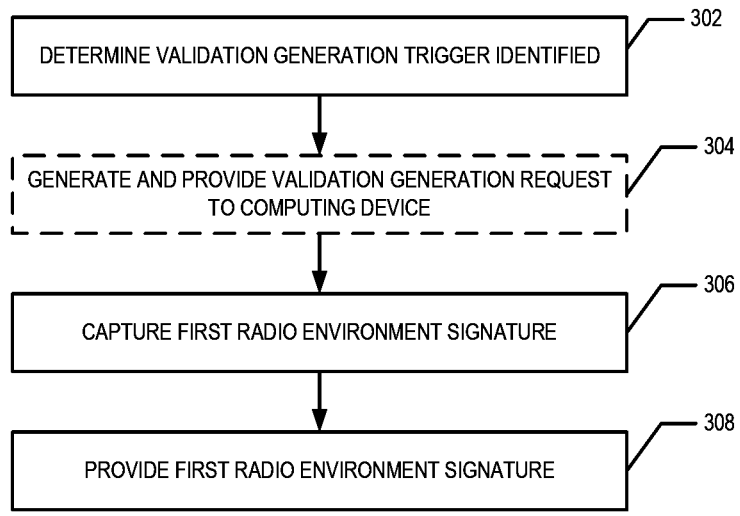
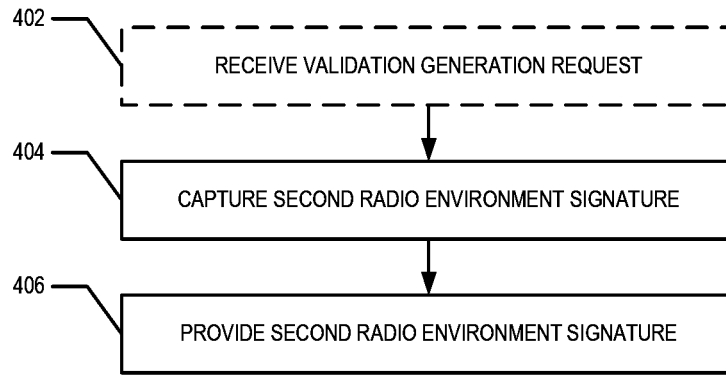

AERIAL VEHICLE AND COMPUTING DEVICE INTERACTION FOR VALIDATING AERIAL VEHICLE ACTIVITY

TECHNOLOGICAL FIELD

An example embodiment relates validating, confirming, and/or substantiating activity of an aerial vehicle (e.g., drone). In particular, an example embodiment generally relates to validating, confirming, and/or substantiating delivery and/or pickup activity performed by an unmanned, autonomous, semi-autonomous, and/or other aerial vehicle.

BACKGROUND

In various scenarios, it is contemplated that a drone may be used to perform delivery, pickup, and/or other operations. As use of drones becomes more widespread over time, the need for accurate and reliable validation of drone location and/or activity becomes apparent. However, conventional techniques for validating the location and/or activity of drones may be spoofed and/or may be susceptible to various other attacks. Thus, a technical improvement is desired.

BRIEF SUMMARY

Various embodiments provide methods, apparatus, systems, and computer program products for validating, confirming, substantiating, and/or the like aerial vehicle (AV) activity based on an interaction of the AV with a computing device. In various embodiments, the AV is an unmanned, autonomous, semi-autonomous, and/or other aerial vehicle. In various embodiments, the AV activity being validated, confirmed, substantiated, and/or the like is a delivery performed by the AV, a pickup performed by the AV, the location of the AV at a point in time, and/or the like. In an example embodiment, the computing device the AV interacts with to form the basis of the validation, confirmation, substantiation, and/or the like of the AV activity may be a computing device associated with a known location (e.g., a delivery location, pickup location, and/or the like), an entity associated with the activity (e.g., operated by and/or on behalf of an entity that is party to the delivery and/or pickup), and/or the like.

In various embodiments, an AV may generate a first radio environment signature based on access points and/or radio frequency signals observed by the AV. A computing device may generate a second radio environment signature based on access points and/or radio frequency signals observed by the computing device. The computing device may be a computing device with a known location, is located near or at a planned location for the AV (e.g., a delivery location, pickup location, and/or the like), is associated with an entity that is a party to activity of the AV (e.g., a party to the pickup or delivery of an item by the AV), and/or the like. One or more processors may obtain (e.g., receive, access, and/or the like) at least a part of each of the first radio environment signature and the second radio environment signature. In various embodiments, the one or more processors may be part of the AV, part of the computing device, or part of a network device. The one or more processors may then determine whether the obtained parts of the first radio environment signature and the second radio environment signature satisfy a similarity criteria. For example, the similarity criteria may correspond to determining whether the AV and the computing device observed the same access points and/or radio frequency signals, whether the access points and/or radio frequency signals observed by both the AV and the computing device were observed with attributes (signal strength, timing parameters, beam forming characteristics, and/or the like) that are consistent, and/or the like. Responsive to determining that the obtained parts of the first radio environment signature and the second radio environment signature satisfy a similarity criteria, a validation data object is generated. The validation data object may then be stored in a validation database for use in validating, confirming, substantiating, and/or the like AV activity.

For example, in various embodiments, a request for validating, confirming, substantiating, and/or the like AV activity may be obtained. For example, an audit of the AV activity may be performed. In another example, a party of a delivery and/or pickup may request confirmation of the completion of the delivery and/or pickup. In response to such a request, a network device may access the validation database to determine if a corresponding validation data object is stored in the validation database. When a corresponding validation data object is stored in the validation database, the validation data object may be accessed to determine a particular location and/or a particular time associated with the validation data object. It may further be determined whether the particular location and/or the particular time match a planned location and/or a planned time, respectively, for the AV activity. For example, the planned location may be a pickup and/or delivery location and the planned time may be a time or range of time during which the pickup and/or delivery was scheduled to occur. When it is determined that the particular location and/or the particular time match a planned location and/or a planned time, respectively, the network device may provide a notification or confirmation of the AV's activity.

In an example embodiment, one or more processors obtain a first radio environment signature associated with an AV and a second radio environment signature associated with a computing device. Responsive to determining that the first radio environment signature and the second radio environment signature satisfy a similarity criteria, the one or more processors generate a validation data object verifying one or more of (i) that a location of the AV substantially corresponds to a location of the computing device at a time associated with at least one of the first radio environment signature or the second radio environment signature, (ii) a AV delivery associated with the AV and the computing device, or (iii) a AV pickup associated with the AV and the computing device. The one or more processors store or provide validation information based on the validation data object.

In an example embodiment, one or more processors generate a radio environment signature associated with an interaction between an aerial vehicle (AV) and a computing device. The radio environment signature is generated based at least on observations by a radio sensor associated with the one or more processors. The one or more processors are of the AV or of the computing device. The one or more processors provide the radio environment signature as part of a verification process. The verification process is configured to verify one or more of (i) that a location of the AV substantially corresponds to a location of the computing device at a time associated with the interaction, (ii) an AV delivery associated with the AV and the computing device, or (iii) an AV pickup associated with the AV and the computing device.

In an example embodiment, one or more processors obtain at least one validation data object corresponding to an interaction between an aerial vehicle (AV) and a computing device; determine, based at least in part on the at least one validation data object, that the AV was located at a particular location at a particular time when the interaction occurred; and determine whether the particular location and the particular time match a planned location of the AV at a planned time, respectively. The one or more processors, responsive to determining that the particular location and the particular time match the planned location of the AV at the planned time, respectively, provide a confirmation that the AV was at the planned location at the planned time.

In one aspect of the present disclosure, a method is provided. The method comprises obtaining, by one or more processors, a first radio environment signature associated with an aerial vehicle (AV); obtaining, by the one or more processors, a second radio environment signature associated with a computing device; and responsive to determining that the first radio environment signature and the second radio environment signature satisfy a similarity criteria, generating a validation data object verifying one or more of (i) that a location of the AV substantially corresponds to a location of the computing device at a time associated with at least one of the first radio environment signature or the second radio environment signature, (ii) a AV delivery associated with the AV and the computing device, or (iii) a AV pickup associated with the AV and the computing device. The method further comprises storing or providing, by the one or more processors, validation information based on the validation data object.

In an example embodiment, the validation data object is at least one of (a) a verification message verifying the location of the AV at the time associated with at least one of the first radio environment signature or the second radio environment signature, (b) a proximity validated radio environment signature or (b) a cryptographically signed proximity validated radio environment signature generated based on at least one of the first radio environment signature or the second radio environment signature. In an example embodiment, the proximity validated radio environment signature is one of at least a portion of the first radio environment signature, at least a portion of the second radio environment signature, or a hybrid radio environment signature generated by extracting information from both the first radio environment signature and the second radio environment signature. In an example embodiment, the cryptographically signed proximity validated radio environment signature using a cryptographic certificate configured to securely identify one of the AV or the computing device.

In an example embodiment, the first radio environment signature and the second radio environment signature each comprise information regarding at least one of at least one 5G access point observed by a corresponding one of the AV and the computing device, information regarding detected and/or emitted beamforming characteristics of a 5G access point observed by a corresponding one of the AV and the computing device, information regarding one or more 5G peer-to-peer communications received and/or transmitted by a corresponding one of the AV and the computing device, or information regarding the full 5G environment observed by a corresponding one of the AV and the computing device. In an example embodiment, the validation data object indicates that the AV was located at a delivery location at a delivery time or at a pickup location at a pickup time. In an example embodiment, at least one of the obtaining of the first radio environment signature is responsive to determining that a validation generation trigger has been identified, or a request is generated and provided such that the second device receives the request and provides the second radio environment signature responsive to determining that a validation generation trigger has been identified. In an example embodiment, the first radio environment signature and the second radio environment signature each comprise information identifying each 5G signal observable to a respective one of the AV and the computing device at the time the respective radio environment signature was generated.

According to another aspect of the present disclosure, an apparatus is provided. In an example embodiment, the apparatus comprises at least one processor, at least one memory storing computer program code, and a communications interface. The at least one memory and the computer program code are configured to, with the processor, cause the apparatus to at least obtain a first radio environment signature associated with an aerial vehicle (AV); obtain a second radio environment signature associated with a computing device; and responsive to determining that the first radio environment signature and the second radio environment signature satisfy a similarity criteria, generate a validation data object verifying one or more of (i) that a location of the AV substantially corresponds to a location of the computing device at a time associated with at least one of the first radio environment signature or the second radio environment signature, (ii) a AV delivery associated with the AV and the computing device, or (iii) a AV pickup associated with the AV and the computing device. The at least one memory and the computer program code are further configured to, with the processor, cause the apparatus to at least store or provide validation information based on the validation data object.

In an example embodiment, the validation data object is at least one of (a) a verification message verifying the location of the AV at the time associated with at least one of the first radio environment signature or the second radio environment signature, (b) a proximity validated radio environment signature or (b) a cryptographically signed proximity validated radio environment signature generated based on at least one of the first radio environment signature or the second radio environment signature. In an example embodiment, the proximity validated radio environment signature is one of at least a portion of the first radio environment signature, at least a portion of the second radio environment signature, or a hybrid radio environment signature generated by extracting information from both the first radio environment signature and the second radio environment signature. In an example embodiment, the cryptographically signed proximity validated radio environment signature using a cryptographic certificate configured to securely identify one of the AV or the computing device.

In an example embodiment, the first radio environment signature and the second radio environment signature each comprise information regarding at least one of at least one 5G access point observed by a corresponding one of the AV and the computing device, information regarding detected and/or emitted beamforming characteristics of a 5G access point observed by a corresponding one of the AV and the computing device, information regarding one or more 5G peer-to-peer communications received and/or transmitted by a corresponding one of the AV and the computing device, or information regarding the full 5G environment observed by a corresponding one of the AV and the computing device. In an example embodiment, the validation data object indicates that the AV was located at a delivery location at a delivery time or at a pickup location at a pickup time. In an example embodiment, at least one of the obtaining of the first radio environment signature is responsive to determining that a validation generation trigger has been identified, or a request is generated and provided such that the second device receives the request and provides the second radio environment signature responsive to determining that a validation generation trigger has been identified. In an example embodiment, the first radio environment signature and the second radio environment signature each comprise information identifying each 5G signal observable to a respective one of the AV and the computing device at the time the respective radio environment signature was generated.

In still another aspect of the present disclosure, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to obtain a first radio environment signature associated with an aerial vehicle (AV); obtain a second radio environment signature associated with a computing device; and responsive to determining that the first radio environment signature and the second radio environment signature satisfy a similarity criteria, generate a validation data object verifying one or more of (i) that a location of the AV substantially corresponds to a location of the computing device at a time associated with at least one of the first radio environment signature or the second radio environment signature, (ii) a AV delivery associated with the AV and the computing device, or (iii) a AV pickup associated with the AV and the computing device. The computer-readable program code portions further comprise executable portions configured, when executed by a processor of an apparatus, to cause the apparatus to store or provide validation information based on the validation data object.

In an example embodiment, the validation data object is at least one of (a) a verification message verifying the location of the AV at the time associated with at least one of the first radio environment signature or the second radio environment signature, (b) a proximity validated radio environment signature or (b) a cryptographically signed proximity validated radio environment signature generated based on at least one of the first radio environment signature or the second radio environment signature. In an example embodiment, the proximity validated radio environment signature is one of at least a portion of the first radio environment signature, at least a portion of the second radio environment signature, or a hybrid radio environment signature generated by extracting information from both the first radio environment signature and the second radio environment signature. In an example embodiment, the cryptographically signed proximity validated radio environment signature using a cryptographic certificate configured to securely identify one of the AV or the computing device.

In an example embodiment, the first radio environment signature and the second radio environment signature each comprise information regarding at least one of at least one 5G access point observed by a corresponding one of the AV and the computing device, information regarding detected and/or emitted beamforming characteristics of a 5G access point observed by a corresponding one of the AV and the computing device, information regarding one or more 5G peer-to-peer communications received and/or transmitted by a corresponding one of the AV and the computing device, or information regarding the full 5G environment observed by a corresponding one of the AV and the computing device. In an example embodiment, the validation data object indicates that the AV was located at a delivery location at a delivery time or at a pickup location at a pickup time. In an example embodiment, at least one of the obtaining of the first radio environment signature is responsive to determining that a validation generation trigger has been identified, or a request is generated and provided such that the second device receives the request and provides the second radio environment signature responsive to determining that a validation generation trigger has been identified. In an example embodiment, the first radio environment signature and the second radio environment signature each comprise information identifying each 5G signal observable to a respective one of the AV and the computing device at the time the respective radio environment signature was generated.

According to yet another aspect of the present disclosure, an apparatus is provided. In an example embodiment, the apparatus comprises means for obtaining a first radio environment signature associated with an aerial vehicle (AV). The apparatus comprises means for obtaining a second radio environment signature associated with a computing device. The apparatus comprises means for, responsive to determining that the first radio environment signature and the second radio environment signature satisfy a similarity criteria, generating a validation data object verifying one or more of (i) that a location of the AV substantially corresponds to a location of the computing device at a time associated with at least one of the first radio environment signature or the second radio environment signature, (ii) a AV delivery associated with the AV and the computing device, or (iii) a AV pickup associated with the AV and the computing device. The apparatus comprises means for storing or providing, by the one or more processors, validation information based on the validation data object.

According to an aspect of the present disclosure, a method is provided. In an example embodiment, the method comprises generating, by one or more processors, a radio environment signature associated with an interaction between an aerial vehicle (AV) and a computing device. The radio environment signature is generated based at least on observations by a radio sensor associated with the one or more processors. The one or more processors are of the AV or of the computing device. The method further comprises providing, by the one or more processors, the radio environment signature as part of a verification process. The verification process is configured to verify one or more of (i) that a location of the AV substantially corresponds to a location of the computing device at a time associated with the interaction, (ii) an AV delivery associated with the AV and the computing device, or (iii) an AV pickup associated with the AV and the computing device.

In an example embodiment, the method further comprises receiving another radio environment signature associated with the interaction between the AV and the computing device, wherein the other radio environment signature is based at least on observations by a radio sensor associated with the other of the AV or the computing device; determining whether the radio environment signature and the other radio environment signature satisfy a similarity criteria; responsive to determining that the radio environment signature and the other radio environment signature satisfy the similarity criteria, generating a validation data object verifying one or more of (i) that a location of the AV substantially corresponds to a location of the computing device at a time associated with at least one of the first radio environment signature or the second radio environment signature, (ii) a AV delivery associated with the AV and the computing device, or (iii) a AV pickup associated with the AV and the computing device; and providing validation information based on the validation data object. In an example embodiment, the validation data object indicates that the AV was located at a delivery location at a delivery time or at a pickup location at a pickup time. In an example embodiment, the validation data object is at least one of (a) a verification message verifying the location of the AV at the time associated with at least one of the first radio environment signature or the second radio environment signature, (b) a proximity validated radio environment signature or (b) a cryptographically signed proximity validated radio environment signature generated based on at least one of the first radio environment signature or the second radio environment signature. In an example embodiment, the proximity validated radio environment signature is one of at least a portion of the first radio environment signature, at least a portion of the second radio environment signature, or a hybrid radio environment signature generated by extracting information from both the first radio environment signature and the second radio environment signature. In an example embodiment, the cryptographically signed proximity validated radio environment signature using a cryptographic certificate configured to securely identify one of the AV or the computing device. In an example embodiment, determining that the radio environment signature and the other radio environment signature satisfy the similarity requirement comprises a negotiation between the AV and the computing device to determine whether the radio environment signature and the other radio environment signature are consistent with one another. In an example embodiment, the radio environment signature comprises information regarding at least one of at least one 5G access point observed by a corresponding one of the AV and the computing device, information regarding detected and/or emitted beamforming characteristics of a 5G access point observed by a corresponding one of the AV and the computing device, information regarding one or more 5G peer-to-peer communications received and/or transmitted by a corresponding one of the AV and the computing device, or information regarding the full 5G environment observed by a corresponding one of the AV and the computing device.

According to another aspect of the present disclosure, an apparatus is provided. In an example embodiment, the apparatus comprises at least one processor, at least one memory storing computer program code, and a communications interface. The at least one memory and the computer program code are configured to, with the processor, cause the apparatus to at least generate a radio environment signature associated with an interaction between an aerial vehicle (AV) and a computing device. The radio environment signature is generated based at least on observations by a radio sensor associated with the one or more processors. The apparatus is one of the AV or of the computing device. The at least one memory and the computer program code are further configured to, with the processor, cause the apparatus to at least provide the radio environment signature as part of a verification process. The verification process is configured to verify one or more of (i) that a location of the AV substantially corresponds to a location of the computing device at a time associated with the interaction, (ii) an AV delivery associated with the AV and the computing device, or (iii) an AV pickup associated with the AV and the computing device.

In an example embodiment, the at least one memory and the computer program code are further configured to, with the processor, cause the apparatus to at least receive another radio environment signature associated with the interaction between the AV and the computing device, wherein the other radio environment signature is based at least on observations by a radio sensor associated with the other of the AV or the computing device; determine whether the radio environment signature and the other radio environment signature satisfy a similarity criteria; responsive to determining that the radio environment signature and the other radio environment signature satisfy the similarity criteria, generate a validation data object verifying one or more of (i) that a location of the AV substantially corresponds to a location of the computing device at a time associated with at least one of the first radio environment signature or the second radio environment signature, (ii) a AV delivery associated with the AV and the computing device, or (iii) a AV pickup associated with the AV and the computing device; and provide validation information based on the validation data object. In an example embodiment, the validation data object indicates that the AV was located at a delivery location at a delivery time or at a pickup location at a pickup time. In an example embodiment, the validation data object is at least one of (a) a verification message verifying the location of the AV at the time associated with at least one of the first radio environment signature or the second radio environment signature, (b) a proximity validated radio environment signature or (b) a cryptographically signed proximity validated radio environment signature generated based on at least one of the first radio environment signature or the second radio environment signature. In an example embodiment, the proximity validated radio environment signature is one of at least a portion of the first radio environment signature, at least a portion of the second radio environment signature, or a hybrid radio environment signature generated by extracting information from both the first radio environment signature and the second radio environment signature. In an example embodiment, the cryptographically signed proximity validated radio environment signature using a cryptographic certificate configured to securely identify one of the AV or the computing device. In an example embodiment, determining that the radio environment signature and the other radio environment signature satisfy the similarity requirement comprises a negotiation between the AV and the computing device to determine whether the radio environment signature and the other radio environment signature are consistent with one another. In an example embodiment, the radio environment signature comprises information regarding at least one of at least one 5G access point observed by a corresponding one of the AV and the computing device, information regarding detected and/or emitted beamforming characteristics of a 5G access point observed by a corresponding one of the AV and the computing device, information regarding one or more 5G peer-to-peer communications received and/or transmitted by a corresponding one of the AV and the computing device, or information regarding the full 5G environment observed by a corresponding one of the AV and the computing device.

In still another aspect of the present disclosure, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to generate a radio environment signature associated with an interaction between an aerial vehicle (AV) and a computing device. The radio environment signature is generated based at least on observations by a radio sensor associated with the one or more processors. The apparatus is one of the AV or of the computing device. The computer-readable program code portions comprise executable portions further configured, when executed by a processor of an apparatus, to cause the apparatus to provide the radio environment signature as part of a verification process. The verification process is configured to verify one or more of (i) that a location of the AV substantially corresponds to a location of the computing device at a time associated with the interaction, (ii) an AV delivery associated with the AV and the computing device, or (iii) an AV pickup associated with the AV and the computing device.

In an example embodiment, the computer-readable program code portions comprise executable portions further configured, when executed by a processor of an apparatus, to cause the apparatus to receive another radio environment signature associated with the interaction between the AV and the computing device, wherein the other radio environment signature is based at least on observations by a radio sensor associated with the other of the AV or the computing device; determine whether the radio environment signature and the other radio environment signature satisfy a similarity criteria; responsive to determining that the radio environment signature and the other radio environment signature satisfy the similarity criteria, generate a validation data object verifying one or more of (i) that a location of the AV substantially corresponds to a location of the computing device at a time associated with at least one of the first radio environment signature or the second radio environment signature, (ii) a AV delivery associated with the AV and the computing device, or (iii) a AV pickup associated with the AV and the computing device; and provide validation information based on the validation data object. In an example embodiment, the validation data object indicates that the AV was located at a delivery location at a delivery time or at a pickup location at a pickup time. In an example embodiment, the validation data object is at least one of (a) a verification message verifying the location of the AV at the time associated with at least one of the first radio environment signature or the second radio environment signature, (b) a proximity validated radio environment signature or (b) a cryptographically signed proximity validated radio environment signature generated based on at least one of the first radio environment signature or the second radio environment signature. In an example embodiment, the proximity validated radio environment signature is one of at least a portion of the first radio environment signature, at least a portion of the second radio environment signature, or a hybrid radio environment signature generated by extracting information from both the first radio environment signature and the second radio environment signature. In an example embodiment, the cryptographically signed proximity validated radio environment signature using a cryptographic certificate configured to securely identify one of the AV or the computing device. In an example embodiment, determining that the radio environment signature and the other radio environment signature satisfy the similarity requirement comprises a negotiation between the AV and the computing device to determine whether the radio environment signature and the other radio environment signature are consistent with one another. In an example embodiment, the radio environment signature comprises information regarding at least one of at least one 5G access point observed by a corresponding one of the AV and the computing device, information regarding detected and/or emitted beamforming characteristics of a 5G access point observed by a corresponding one of the AV and the computing device, information regarding one or more 5G peer-to-peer communications received and/or transmitted by a corresponding one of the AV and the computing device, or information regarding the full 5G environment observed by a corresponding one of the AV and the computing device.

According to yet another aspect of the present disclosure, an apparatus is provided. In an example embodiment, the apparatus comprises means for generating a radio environment signature associated with an interaction between an aerial vehicle (AV) and a computing device. The radio environment signature is generated based at least on observations by a radio sensor associated with the one or more processors. The apparatus is one of the AV or of the computing device. The apparatus further comprises means for providing the radio environment signature as part of a verification process. The verification process is configured to verify one or more of (i) that a location of the AV substantially corresponds to a location of the computing device at a time associated with the interaction, (ii) an AV delivery associated with the AV and the computing device, or (iii) an AV pickup associated with the AV and the computing device.

According to another aspect of the present disclosure, a method is provided. In an example embodiment, the method comprises obtaining, by one or more processors, at least one validation data object corresponding to an interaction between an aerial vehicle (AV) and a computing device; determining, by the one or more processors and based at least in part on the at least one validation data object, that the AV was located at a particular location at a particular time when the interaction occurred; and determining, by the one or more processors, whether the particular location and the particular time match a planned location of the AV at a planned time, respectively. The method further comprises responsive to determining that the particular location and the particular time match the planned location of the AV at the planned time, respectively, providing a confirmation that the AV was at the planned location at the planned time.

In an example embodiment, the planned location is a delivery location or pickup location and the planned time is a delivery time or a pickup time and the confirmation confirms that the AV performed a delivery or pickup at the delivery or pickup location at the delivery or pickup time. In an example embodiment, the validation data object is generated based on at least one of the first radio environment signature or the second radio environment signature, the first radio environment signature generated by the AV in association with an interaction between the AV and the computing device and the second radio environment signature generated by the computing device in association with the interaction between the AV and the computing device. In an example embodiment, the first radio environment signature and the second radio environment signature each comprise information regarding at least one of at least one 5G access point observed by a corresponding one of the AV and the computing device, information regarding detected and/or emitted beamforming characteristics of a 5G access point observed by a corresponding one of the AV and the computing device, information regarding one or more 5G peer-to-peer communications received and/or transmitted by a corresponding one of the AV and the computing device, or information regarding the full 5G environment observed by a corresponding one of AV and the computing device.

According to another aspect of the present disclosure, an apparatus is provided. In an example embodiment, the apparatus comprises at least one processor, at least one memory storing computer program code, and a communications interface. The at least one memory and the computer program code are configured to, with the processor, cause the apparatus to at least obtain at least one validation data object corresponding to an interaction between an aerial vehicle (AV) and a computing device; determine, based at least in part on the at least one validation data object, that the AV was located at a particular location at a particular time when the interaction occurred; and determine whether the particular location and the particular time match a planned location of the AV at a planned time, respectively. The at least one memory and the computer program code are further configured to, with the processor, cause the apparatus to at least responsive to determining that the particular location and the particular time match the planned location of the AV at the planned time, respectively, provide a confirmation that the AV was at the planned location at the planned time.

In an example embodiment, the planned location is a delivery location or pickup location and the planned time is a delivery time or a pickup time and the confirmation confirms that the AV performed a delivery or pickup at the delivery or pickup location at the delivery or pickup time. In an example embodiment, the validation data object is generated based on at least one of the first radio environment signature or the second radio environment signature, the first radio environment signature generated by the AV in association with an interaction between the AV and the computing device and the second radio environment signature generated by the computing device in association with the interaction between the AV and the computing device. In an example embodiment, the first radio environment signature and the second radio environment signature each comprise information regarding at least one of at least one 5G access point observed by a corresponding one of the AV and the computing device, information regarding detected and/or emitted beamforming characteristics of a 5G access point observed by a corresponding one of the AV and the computing device, information regarding one or more 5G peer-to-peer communications received and/or transmitted by a corresponding one of the AV and the computing device, or information regarding the full 5G environment observed by a corresponding one of AV and the computing device.

In still another aspect of the present disclosure, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to obtain at least one validation data object corresponding to an interaction between an aerial vehicle (AV) and a computing device; determine, based at least in part on the at least one validation data object, that the AV was located at a particular location at a particular time when the interaction occurred; and determine whether the particular location and the particular time match a planned location of the AV at a planned time, respectively. The computer-readable program code portions comprise executable portions further configured, when executed by a processor of an apparatus, to cause the apparatus to responsive to determining that the particular location and the particular time match the planned location of the AV at the planned time, respectively, provide a confirmation that the AV was at the planned location at the planned time.

In an example embodiment, the planned location is a delivery location or pickup location and the planned time is a delivery time or a pickup time and the confirmation confirms that the AV performed a delivery or pickup at the delivery or pickup location at the delivery or pickup time. In an example embodiment, the validation data object is generated based on at least one of the first radio environment signature or the second radio environment signature, the first radio environment signature generated by the AV in association with an interaction between the AV and the computing device and the second radio environment signature generated by the computing device in association with the interaction between the AV and the computing device. In an example embodiment, the first radio environment signature and the second radio environment signature each comprise information regarding at least one of at least one 5G access point observed by a corresponding one of the AV and the computing device, information regarding detected and/or emitted beamforming characteristics of a 5G access point observed by a corresponding one of the AV and the computing device, information regarding one or more 5G peer-to-peer communications received and/or transmitted by a corresponding one of the AV and the computing device, or information regarding the full 5G environment observed by a corresponding one of AV and the computing device.

According to still another aspect of the present disclosure, an apparatus is provided. In an example embodiment, the apparatus comprises means for obtaining at least one validation data object corresponding to an interaction between an aerial vehicle (AV) and a computing device. The apparatus comprises means for determining, based at least in part on the at least one validation data object, that the AV was located at a particular location at a particular time when the interaction occurred. The apparatus comprises means for determining whether the particular location and the particular time match a planned location of the AV at a planned time, respectively. The apparatus comprises means for, responsive to determining that the particular location and the particular time match the planned location of the AV at the planned time, respectively, providing a confirmation that the AV was at the planned location at the planned time.

BRIEF DESCRIPTION OF THE DRAWINGS

Figure 1:
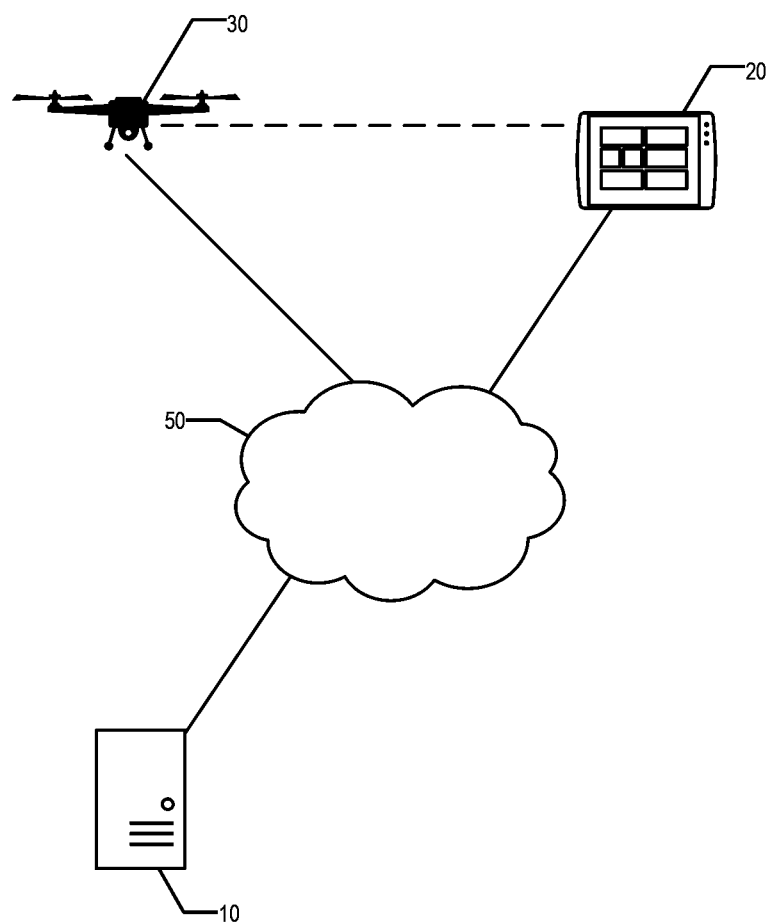
Figure 2A:
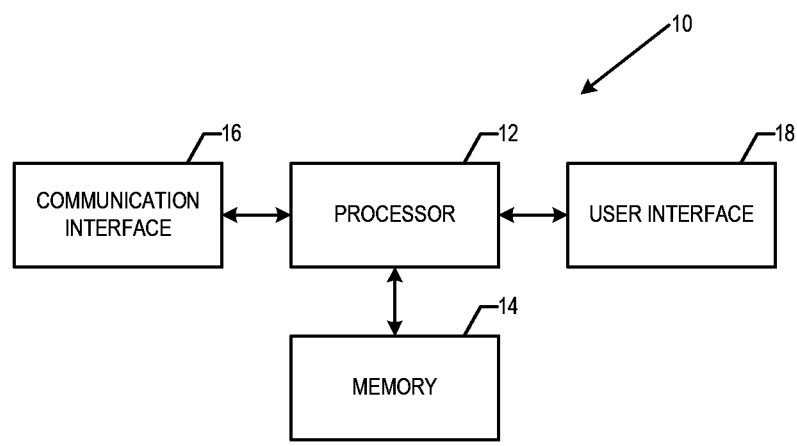
Figure 2B:
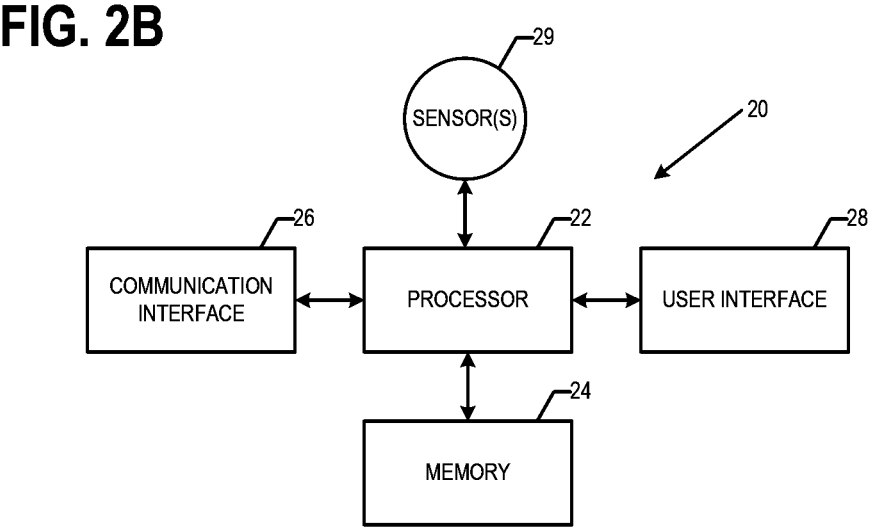
Figure 2C:
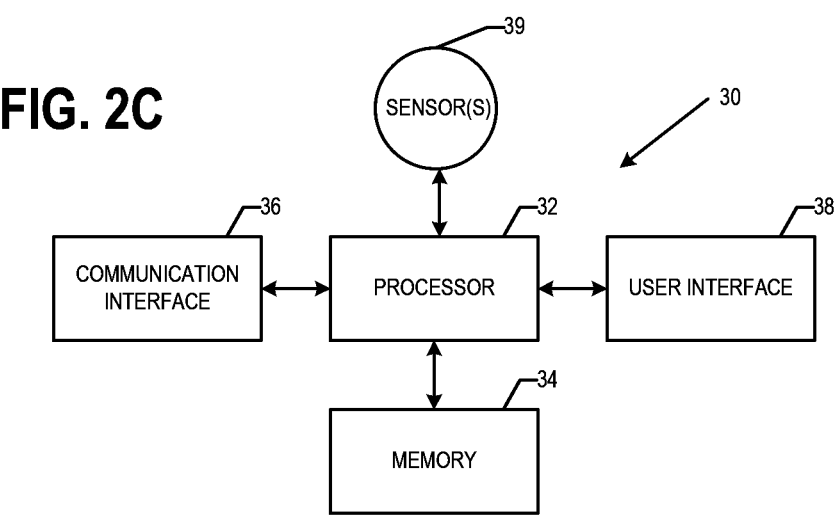
Figure 5:
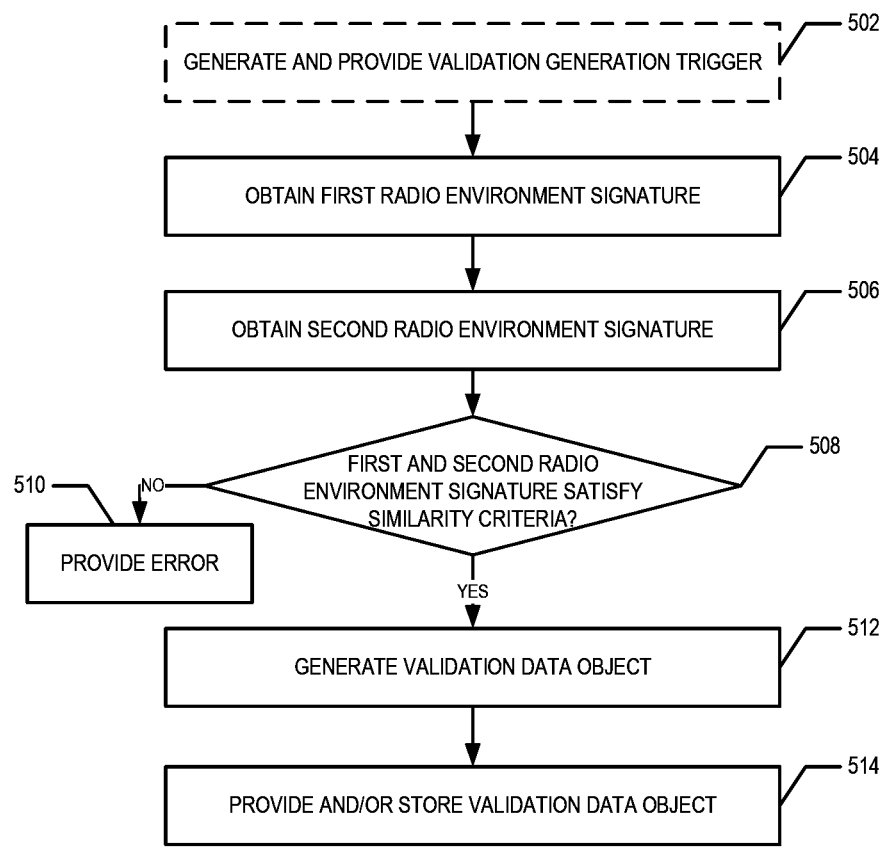
Figure 6:
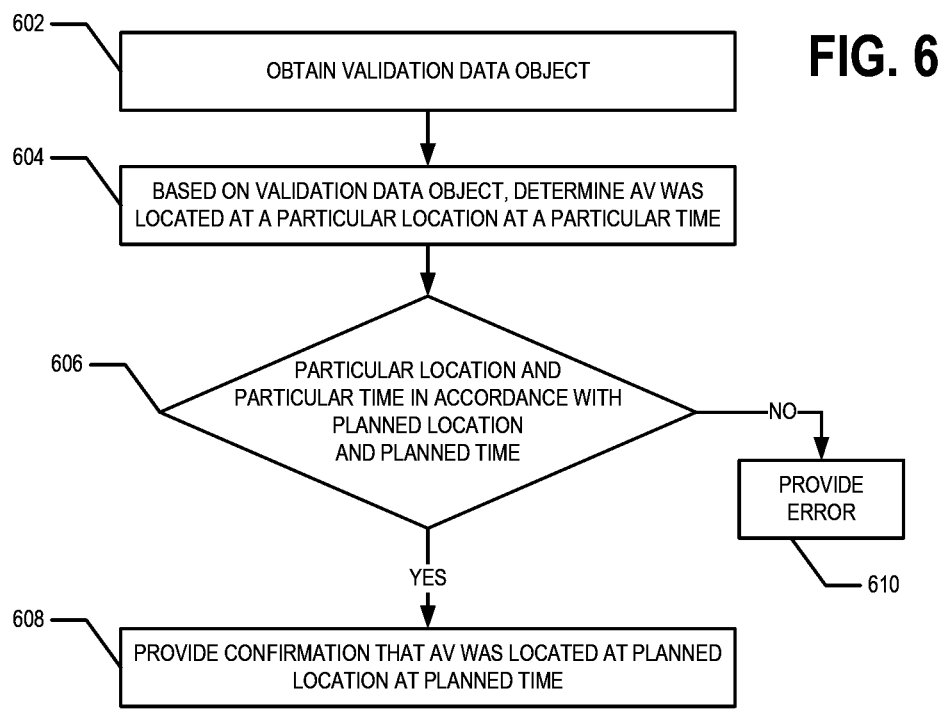

Having thus described certain example embodiments in general terms, reference will hereinafter be made to the accompanying drawings, which are not necessarily drawn to scale, and wherein:

FIG. 1 is a block diagram showing an example system of one embodiment of the present disclosure;

FIG. 2A is a block diagram of a network device that may be specifically configured in accordance with an example embodiment;

FIG. 2B is a block diagram of a computing device that may be specifically configured in accordance with an example embodiment;

FIG. 2C is a block diagram of an aerial vehicle (AV) that may be specifically configured in accordance with an example embodiment;

FIG. 3 is a flowchart illustrating operations performed, such as by the AV of FIG. 2C, in accordance with an example embodiment;

FIG. 4 is a flowchart illustrating operations performed, such as by the computing device of FIG. 2B, in accordance with an example embodiment;

FIG. 5 is a flowchart illustrating operations performed, such as by the network device of FIG. 2A, the computing device of FIG. 2B, and/or the AV of FIG. 2C, in accordance with an example embodiment; and FIG. 6 is a flowchart illustrating operations performed, such as by the network device of FIG. 2A, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values and/or tolerances that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus and computer program products are provided in accordance with an example embodiment in order to validate, confirm, substantiate, and/or the like activity of an AV based on an interaction of the AV with a computing device. In various embodiments, the AV is an unmanned, autonomous, semi-autonomous, and/or other aerial vehicle. In various embodiments, the AV activity being validated, confirmed, substantiated, and/or the like is a delivery performed by the AV, a pickup performed by the AV, the location of the AV at a point in time, and/or the like. In an example embodiment, the computing device the AV interacts with to form the basis of the validation, confirmation, substantiation, and/or the like of the AV activity may be a computing device associated with a known location (e.g., a delivery location, pickup location, and/or the like), an entity associated with the activity (e.g., operated by and/or on behalf of an entity that is party to the delivery and/or pickup), and/or the like.

In various embodiments, an AV may generate a first radio environment signature based on access points and/or radio frequency signals observed by the AV. A computing device may generate a second radio environment signature based on access points and/or radio frequency signals observed by the computing device. The computing device may be a computing device with a known location, is located near or at a planned location for the AV (e.g., a delivery location, pickup location, and/or the like), is associated with an entity that is a party to activity of the AV (e.g., a party to the pickup or delivery of an item by the AV), and/or the like. In various embodiments, the first and/or second radio environment signatures may include an indication of and/or information regarding one or more 5G access points and/or 5G signals observed by a respective one of the AV and the computing device. For example, the first and/or second radio environment signature may comprise information about communication(s) (e.g., 5G peer-to-peer communication(s)) between the AV and the computing device during their interaction.

One or more processors may obtain (e.g., receive, access, and/or the like) at least a part of each of the first radio environment signature and the second radio environment signature. In various embodiments, the one or more processors may be part of the AV, part of the computing device, or part of a network device. For example, the computing device may receive the first radio environment signature generated by the AV. In another example, the AV may receive the second radio environment signature generated by the computing device. In another example, a network device may receive one or both of the first and second radio environment signatures. The one or more processors may then determine whether the obtained parts of the first radio environment signature and the second radio environment signature satisfy a similarity criteria. For example, the similarity criteria may be used to determine whether the radio environment observed by the AV and encoded by the first radio environment signature is the same, similar, and/or consistent with the radio environment observed by the computing device and encoded by the second radio environment signature. For example, the similarity criteria may correspond to determining whether the AV and the computing device observed the same access points and/or emitting devices, whether the access points and/or emitting devices observed by both the AV and the computing device were observed with attributes (signal strength, timing parameters, beam forming characteristics, and/or the like) that are consistent, and/or the like. Responsive to determining that the obtained parts of the first radio environment signature and the second radio environment signature satisfy a similarity criteria, a validation data object is generated. In various embodiments, the validation data object is generated by the AV, the computing device, in collaboration between the AV and the computing device, and/or the network device. In various embodiments, the validation data object may encode an interaction between the AV and the computing device. The validation data object may then be stored in a validation database and/or provided to another computing entity for use in validating, confirming, substantiating, and/or the like AV activity.

For example, in various embodiments, a request for validating, confirming, substantiating, and/or the like AV activity may be obtained. For example, an audit of the AV activity may be performed. In another example, a party of a delivery and/or pickup may request confirmation of the completion of the delivery and/or pickup. In response to such a request, a network device may access the validation database to determine if a corresponding validation data object is stored in the validation database. When a corresponding validation data object is stored in the validation database, the validation data object may be accessed to determine a particular location and/or a particular time associated with the validation data object. It may further be determined whether the particular location and/or the particular time match a planned location and/or a planned time, respectively, for the AV activity. For example, the planned location may be a pickup and/or delivery location and the planned time may be a time or range of time during which the pickup and/or delivery was scheduled to occur. When it is determined that the particular location and/or the particular time match a planned location and/or a planned time, respectively, the network device may provide a notification or confirmation of the AV's activity. In another example, in response to a request for confirmation of the completion of the delivery and/or pickup, a network device may provide validation information based on the validation data object.

FIG. 1 provides an illustration of an example system that can be used in conjunction with various embodiments of the present invention. As shown in FIG. 1, the system may include one or more network devices 10, one or more computing devices 20, one or more AVs 30, one or more networks 50, and/or the like. In various embodiments, an AV 30 may be an unmanned, autonomous, semi-autonomous, and/or other aerial vehicle. In various embodiments, the AV 30 may be used to pick up and/or deliver items, act as a courier, perform "last mile deliveries," and/or the like. In various embodiments, a computing device 20 may be a user device, an infrastructure device (e.g., server, edge device, 5G enabled edge device and/or node, and/or the like), and/or other computing entity comprising sensors that enable the computing device 20 to capture, generate, and/or determine a radio environment signature corresponding to access points and/or radio frequency signals detectable at the location of the computing device 20. In various embodiments, the computing device 20 is associated with a known location (e.g., a delivery location, pickup location, and/or the like), an entity associated with the activity (e.g., operated by and/or on behalf of an entity that is party to the delivery and/or pickup), and/or the like. In an example embodiment, the network device 10 is a server, group of servers, distributed computing system, and/or other computing system. For example, the network device 10 may be in communication with one or more computing devices 20, one or more AVs 30, and/or the like via one or more wired or wireless networks 50.

In an example embodiment, a network device 10 may comprise components similar to those shown in the example network device 10 diagrammed in FIG. 2A. In an example embodiment, the network device 10 is configured to receive first and/or second radio environment signatures, determine whether first and second radio environment signatures satisfy a similarity criteria, generate a validation data object, obtain and store a validation data object, validate AV activity in response to receiving a request for AV activity validation, and/or the like For example, as shown in FIG. 2A, the network device 10 may comprise a processor 12, memory 14, a user interface 18, a communications interface 16, and/or other components configured to perform various operations, procedures, functions or the like described herein. In various embodiments, the network device 10 stores a geographical database and/or positioning map (e.g., in memory 14), such as a radio environment positioning map, for example. In various embodiments, the network device 10 stores a validation database (e.g., in memory 14). In at least some example embodiments, the memory 14 is non-transitory.

In an example embodiment, a computing device 20 is associated with a known location (e.g., a delivery location, pickup location, and/or the like), an entity associated with the activity (e.g., operated by and/or on behalf of an entity that is party to the delivery and/or pickup), and/or the like. For example, the computing device 20 may be a mobile computing device, desktop computing device, an edge device, a server, a drone, an Internet of things (IoT) device (e.g., a 5G and/or radio sensing/communication-enabled doorbell, garage door opener, security system, and/or the like), an access point, and/or the like. In an example embodiment, the computing device 20 may be configured to capture and/or generate a second radio environment signature, obtain (e.g., receive) a first radio environment signature, determine whether first and second radio environment signatures satisfy a similarity criteria, cryptographically sign a radio environment signature, generate a validation data object, provide (e.g., transmit) the validation data object, and/or the like. In an example embodiment, as shown in FIG. 2B, the computing device 20 may comprise a processor 22, memory 24, a communications interface 26, a user interface 28, one or more sensors 29 and/or other components configured to perform various operations, procedures, functions or the like described herein. In various embodiments, the computing device 20 stores at least a portion of one or more digital maps (e.g., geographic databases, positioning maps, and/or the like) and/or computer executable instructions for performing one or more radio environment signature generation and/or comparison functions and/or validation data object generation functions in memory 24. In at least some example embodiments, the memory 24 is non-transitory.

In various embodiments, the sensors 29 comprise one or more location sensors such as a GNSS sensor, inertial measurement unit (IMU) sensors (e.g., accelerometers, gyroscopes, magnetometers, and/or the like), altimeters, and/or the like. In various embodiments, the sensors 29 comprise one or more image sensors configured to capture visual samples, such as digital camera(s), 3D cameras, 360° cameras, and/or image sensors. In various embodiments, the one or more sensors 29 may comprise one or more interfaces, such as radio interfaces, configured to observe and/or receive signals generated and/or transmitted by one or more access points and/or other computing entities (e.g., AV 30). For example, the one or more interfaces may be configured (possibly in coordination with processor 22) to determine an access point and/or emitting device identifier configured to identify the access point and/or emitting device that generated and/or transmitted a signal observed by the computing device 20, a signal strength of the signal observed by the computing device 20, a one way or round trip time value for a signal observed by the computing device 20, and/or the like. As used herein, when a computing device 20 observes an access point and/or emitting device, the computing device 20 has observed a signal generated and/or transmitted by the access point and/or emitting device. In an example embodiment, the interface may be configured to observe one or more types of signals such as generated and/or transmitted in accordance with one or more protocols such as 5G, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. For example, the interface may be configured to observe signals of one or more modern global cellular formats such as GSM, WCDMA, TD-SCDMA, LTE, LTE-A, CDMA, NB-IoT and/or non-cellular formats such as WLAN, Bluetooth, Bluetooth Low Energy (BLE), Zigbee, Lora, and/or the like. For example, the interface may be configured to observe radio, millimeter, microwave, and/or infrared wavelength signals. In an example embodiment, the interface may be coupled to and/or part of a communications interface 26. In various embodiments, the sensors 29 may comprise various other sensors such as two dimensional (2D) and/or three dimensional (3D) light detection and ranging (LiDAR)(s), long, medium, and/or short range radio detection and ranging (RADAR), ultrasonic sensors, electromagnetic sensors, (near-) infrared (IR) cameras.

In an example embodiment, an AV 30 is an unmanned, autonomous, semi-autonomous, and/or other aerial vehicle. For example, the AV 30 may be a drone, in an example embodiment. In an example embodiment, the AV 30 may be configured to capture and/or generate a first radio environment signature, obtain (e.g., receive) a second radio environment signature, determine whether first and second radio environment signatures satisfy a similarity criteria, cryptographically sign a radio environment signature, generate a validation data object, provide (e.g., transmit) the validation data object, and/or the like. In an example embodiment, as shown in FIG. 2C, the AV 30 may comprise a processor 32, memory 34, a communications interface 36, a user interface 38, one or more sensors 39 and/or other components configured to perform various operations, procedures, functions or the like described herein. In various embodiments, the AV 30 stores at least a portion of one or more digital maps (e.g., geographic databases, positioning maps, and/or the like) and/or computer executable instructions for performing one or more radio environment signature generation and/or comparison functions and/or validation data object generation functions in memory 34. In at least some example embodiments, the memory 34 is non-transitory. The AV 30 may further comprise various components for controlling the AV 30, causing the AV 30 to fly along a route, cause the AV 30 to pick up and carry and/or transport an item from a first location to a second location, cause the AV 30 to leave the item at the second location, and/or the like. For example, the AV 30 may comprise one or more item transporting components and corresponding executable instructions may be stored in memory 34. For example, the AV 30 may comprise one or more flying systems and/or vehicle control and/or routing systems and corresponding executable instructions may be stored in memory 34.

In various embodiments, the sensors 39 comprise one or more location sensors such as a GNSS sensor, inertial measurement unit (IMU) sensors (e.g., accelerometers, gyroscopes, magnetometers, and/or the like), altimeters, and/or the like. In various embodiments, the sensors 39 comprise one or more image sensors configured to capture visual samples, such as digital camera(s), 3D cameras, 360° cameras, and/or image sensors. In various embodiments, the one or more sensors 39 may comprise one or more interfaces, such as radio interfaces, configured to observe and/or receive signals generated and/or transmitted by one or more access points and/or other computing entities (e.g., computing device 20). For example, the one or more interfaces may be configured (possibly in coordination with processor 32) to determine an access point and/or emitting device identifier configured to identify the access point and/or emitting device that generated and/or transmitted a signal observed by the AV 30, a signal strength of the signal observed by the AV 30, a one way or round trip time value for a signal observed by the AV 30, and/or the like. As used herein, when an AV 30 observes an access point and/or emitting device, the AV 30 has observed a signal generated and/or transmitted by the access point and/or emitting device. In an example embodiment, the interface may be configured to observe one or more types of signals such as generated and/or transmitted in accordance with one or more protocols such as 5G, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. For example, the interface may be configured to observe signals of one or more modern global cellular formats such as GSM, WCDMA, TD-SCDMA, LTE, LTE-A, CDMA, NB-IoT and/or non-cellular formats such as WLAN, Bluetooth, Bluetooth Low Energy (BLE), Zigbee, Lora, and/or the like. For example, the interface may be configured to observe radio, millimeter, microwave, and/or infrared wavelength signals. In an example embodiment, the interface may be coupled to and/or part of a communications interface 36. In various embodiments, the sensors 39 may comprise various other sensors such as two dimensional (2D) and/or three dimensional (3D) light detection and ranging (LiDAR)(s), long, medium, and/or short range radio detection and ranging (RADAR), ultrasonic sensors, electromagnetic sensors, (near-) infrared (IR) cameras.

Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In an example embodiment, a network 50 comprises the automotive cloud, digital transportation infrastructure (DTI), radio data system (RDS)/high definition (HD) radio or other digital radio system, and/or the like. For example, a computing device 20 and/or AV 30 may be in communication with a network device 10 via the network 50. For example, a computing device 20 and/or AV 30 may communicate with the network device 10 via a network, such as the Cloud. For example, the Cloud may be a computer network that provides shared computer processing resources and data to computers and other devices connected thereto. For example, the computing device 20 and/or AV 30 may be configured to provide one or more radio environment signatures and/or validation data objects via the network 50. For example, the network device 10 may configured to receive one or more radio environment signatures and/or validation data objects and/or provide confirmation of AV activity via the network 50. In various embodiments, the computing device 20 and AV 30 may communicate via peer-to-peer communication such as 5G peer-to-peer communication, and/or the like.

Certain example embodiments of the network device 10, computing device 20, and AV 30 are described in more detail below with respect to FIGS. 2A, 2B, and 2C.

II. Example Operation(s)

It is contemplated that AVs (e.g., AV 30) may be used to perform various tasks, such as item pickup and/or delivery. For example, an AV may be used as a courier to quickly move items (e.g., paperwork, products, and/or the like) in urban environments without being delayed by ground traffic. However, conventional techniques for validating the location and/or activity of AVs may be spoofed and/or may be susceptible to various other attacks. Thus, a technical problem exists regarding how to accurately and reliably validate, confirm, and/or substantiate AV activity.

Various embodiments of the present invention provide a technical solution to the technical problem of AV activity validation, confirmation, and/or substantiation. For example, various embodiments use a data artifact (e.g., a validation data object) generated responsive to an interaction between an AV 30 and a computing device 20 to validate, confirm, and/or substantiate AV activity. For example, the validation data object may be used to validate, confirm, and/or substantiate a location of the AV 30 at a point in time, that the AV 30 performed a delivery (e.g., was located at a delivery location at a delivery time), that the AV 30 performed a pickup (e.g., was located at a pickup location at a pickup time), and/or the like.

In particular, the validation data object comprises a reliable and accurate description of an interaction between an AV 30 and a computing device 20 that may be used to validate, confirm, and/or substantiate activity of the AV 30. In various embodiments, the first and/or second radio environment signatures comprise information/data regarding the 5G environment observed by a respective one of the AV 30 and the computing device 20. In various embodiments, a proximity validated radio environment signature is generated based on one or more portions of the first radio environment signature captured and/or generated by the AV 30, one or more portions of the second radio environment signature captured and/or generated by the computing device 20, and/or a comparison of the one or more portions of the first radio environment signature and one or more portions of the second radio environment signature. For example, in an example embodiment, responsive to determining that the first and second radio environment signatures satisfy the similarity criteria, one of the first or second radio environment signatures is selected as the proximity validated radio environment signature. In another example, in an example embodiment, the proximity validated radio environment signature combines components extracted from and/or provided by each of the first radio environment signature and the second radio environment signature. In various embodiments, validation data object comprises the proximity validated radio environment signature. In various embodiments, the validation data object comprises a cryptographically signed (e.g., using a cryptographic certificate and/or key corresponding to the AV 30 or the computing device 20) proximity validated radio environment signature. In various embodiments, the validation data object comprises a record of information corresponding to the interaction between the AV 30 and the computing device 20 that is not a radio environment signature. Thus, the generation and/or use of the validation data object described herein, which comprises information and/or validation of an interaction between an AV 30 and a computing device 20, provides a technical solution to technical problems regarding difficulties encountered by conventional techniques for validating AV location and/or activity.

In various embodiments, generation of a validation data object may be triggered responsive to a determination that a validation generation trigger has been identified. In various embodiments, the validation generation trigger may be identified responsive to an AV 30 being arriving at, leaving, being, and/or performing a task (e.g., delivery, pickup, and/or the like) at a planned location and/or at a planned time. For example, an AV 30 may arrive at a pickup location and a pickup time and identify an item to be picked up by the AV. One or more of these actions may cause the AV 30 to identify a validation generation trigger which may then initiate the generation of a validation data object. In another example, an AV 30 may deliver an item to a delivery location and this action may cause the AV 30 to identify a validation generation trigger. In another example, a computing device 20 may detect the presence of an AV 30 (e.g., may detect a signal, such as a 5G signal or other signal, broadcasted and/or transmitted by the AV 30) and the computing device may initiate an interaction with AV 30 which may cause the AV 30 (or the computing device 20) to identify a validation generation trigger and initiate generation of a validation data object. Similarly, the AV 30 could detect the presence of a computing device 20 (e.g., based on monitoring the radio environment observable by the AV 30), which may cause a validation generation trigger to be identified.

Responsive to and/or as part of an interaction between the AV 30 and the computing device 20 which is initiated in response to the determination that a validation generation trigger has been identified, the AV 30 may generate and/or capture a first radio environment signature and the computing device 20 may generate and/or capture a second radio environment signature. In various embodiments, the AV 30 may generate and/or capture a first radio environment signature by capturing one or more measurements and/or observations of the radio environment observable by the AV 30 using the one or more sensors 39 (e.g., radio interfaces) of the AV 30. In various embodiments, a first radio environment signature comprises an aggregation of various sensor measurements and/or observations regarding the radio environment (e.g., radio signals that are observable by the AV 30 via the one or more sensors 39) captured at a particular time and while the AV 30 is located at a particular location.

In various embodiments, the first radio environment signature may be associated with metadata comprising information/data identifying the AV (e.g., an AV identifier), a timestamp corresponding to when the first radio environment signature was generated and/or captured, a location at which the first radio environment signature was generated and/or captured (e.g., a latitude, longitude, and/or elevation; a street address; an indication that the location is a delivery location or pickup location for a particular item; a location given by a local coordinate system (e.g., a coordinate system associated with a building or venue where the location is located); and/or the like), an activity type indicator for the location (e.g., delivery, pickup, passing through), an entity associated with the location (e.g., an entity that is receiving an item being delivered at the location or that is sending an item being picked up at the location), and/or the like.

In various embodiments, a first radio environment signature may comprise information/data regarding one or more observed 5G access points and/or emitting devices. In an example embodiment, the first radio environment signature may comprise a complete description of the 5G environment observed by the AV 30. For example, the first radio environment signature may include a list of each 5G access point and/or emitting device observed by the AV 30. In various embodiments, the first radio environment signature may include information/data identifying at least one 5G access point and/or emitting device observed by the AV, information regarding detected and/or emitted beamforming characteristics of at least one 5G access point and/or emitting device observed by the AV, information regarding one or more 5G peer-to-peer communications received and/or transmitted by the AV, and/or information regarding the full 5G environment observed by the AV (e.g., information regarding every 5G signal observed by the AV while the AV is located at the location where the first radio environment signature is being generated).

In various embodiments, the first radio environment signature may include information regarding various radio environments observable to the AV 30. For example, the first radio environment signature may comprise information/data identifying one or more observed access points and/or emitting devices that are cellular network cells. For example, the first radio environment signature may include global and/or local identifiers configured to identify the one or more access points and/or emitting devices observed by the AV 30 and, possibly, a signal strength and/or pathloss estimate for an observed signal generated and/or transmitted by a respective access point and/or emitting device; timing measurements such as one way and/or round trip timing values, timing advance, and/or other timing measurements for an observed signal generated and/or transmitted by a respective access point and/or emitting device; and/or the like. For example, the first radio environment signature may comprise information/data identifying one or more wireless local area network (WLAN) access points and/or emitting devices observed by the AV 30. For example, the first radio environment signature may include basic service set identifiers (BSSIDs) and/or media access control addresses (MAC addresses) configured to identify the one or more access points and/or emitting devices observed and, possibly, a service set identifiers (SSID) configured to identify a respective access point and/or emitting device; a signal strength measurement such as received signal strength index, a physical power (e.g., Rx) level in dBm, and/or other signal strength measurement and/or pathloss estimate for an observed signal generated and/or transmitted by a respective access point and/or emitting device; timing measurements such as one way and/or round trip timing values, timing advance, and/or other timing measurements for an observed signal generated and/or transmitted by a respective access point and/or emitting device; and/or the like.

Similarly, the computing device 20 may generate and/or capture a second radio environment signature as part of the interaction with the AV 30. In various embodiments, the computing device 20 may generate and/or capture the second radio environment signature by capturing one or more measurements and/or observations of the radio environment observable to the computing device 20 using the one or more sensors 29 (e.g., radio interfaces) of the computing device 20. In various embodiments, a second radio environment signature comprises an aggregation of various sensor measurements and/or observations regarding the radio environment (e.g., radio signals that are observable by the computing device 20 via the one or more sensors 29) captured at a particular time and while the AV 30 is located at a particular location (and the computing device 20 is located at a corresponding location).

In various embodiments, the second radio environment signature may be associated with metadata comprising information/data identifying the computing device 20 (e.g., a computing device identifier), a timestamp corresponding to when the second radio environment signature was generated and/or captured, a location at which the second radio environment signature was generated and/or captured (e.g., a latitude, longitude, and/or elevation; a street address; an indication that the location is a delivery location or pickup location for a particular item; a location given by a local coordinate system (e.g., a coordinate system associated with a building or venue where the location is located); and/or the like), an entity associated with the location and/or the computing device (e.g., an entity operates the computing device 20 and/or on whose behalf the computing device 20 is operated), and/or the like.

Similar to the first radio environment signature, a second radio environment signature may comprise information/data regarding one or more observed 5G access points and/or emitting devices. In an example embodiment, the second radio environment signature may comprise a complete description of the 5G environment observed by the computing device 20. For example, the second radio environment signature may include a list of each 5G access point and/or emitting device observed by the computing device 20. In various embodiments, the second radio environment signature may include information/data identifying at least one 5G access point and/or emitting device observed by the computing device 20, information regarding detected and/or emitted beamforming characteristics of at least one 5G access point and/or emitting device observed by the computing device 20, information regarding one or more 5G peer-to-peer communications received and/or transmitted by the computing device 20, and/or information regarding the full 5G environment observed by the computing device 20 (e.g., information regarding every 5G signal observed by the computing device while the AV is located at the location where the first radio environment signature is being generated).

In various embodiments, the second radio environment signature may include information regarding various radio environments observable to the computing device 20. For example, the second radio environment signature may comprise information/data identifying one or more observed access points and/or emitting devices that are cellular network cells. For example, the second radio environment signature may include global and/or local identifiers configured to identify the one or more access points and/or emitting devices observed and, possibly, a signal strength and/or pathloss estimate for an observed signal generated and/or transmitted by a respective access point and/or emitting device; timing measurements such as one way and/or round trip timing values, timing advance, and/or other timing measurements for an observed signal generated and/or transmitted by a respective access point and/or emitting device; and/or the like. For example, the second radio environment signature may comprise information/data identifying one or more wireless local area network (WLAN) access points and/or emitting devices observed by the computing device 20. For example, the second radio environment signature may include basic service set identifiers (BSSIDs) and/or media access control addresses (MAC addresses) configured to identify the one or more access points and/or emitting devices observed and, possibly, a service set identifiers (SSID) configured to identify a respective access point and/or emitting device; a signal strength measurement such as received signal strength index, a physical power (e.g., Rx) level in dBm, and/or other signal strength measurement and/or pathloss estimate for an observed signal generated and/or transmitted by a respective access point and/or emitting device; timing measurements such as one way and/or round trip timing values, timing advance, and/or other timing measurements for an observed signal generated and/or transmitted by a respective access point and/or emitting device; and/or the like.

In an example embodiment, the computing device 20 is located within a broadcast and/or transmission range of the AV 30 when the interaction occurs and the first and second radio environment signals are generated and/or captured. For example, the interaction between the computing device 20 and the AV 30 may be conducted via peer-to-peer communications (e.g., 5G peer-to-peer communications or another peer-to-peer communication format/protocol). Thus, in various embodiments, the computing device 20 and the AV 30 are located near and/or in proximity with one another when the AV 30 generates and/or captures the first radio environment signature and the computing device 20 generates and/or captures the second radio environment signature. In particular, the AV 30 and the computing device 20 may be near and/or in proximity with one another such that the radio environment observable by the AV 30 may overlap with the radio environment observable by the computing device 20. Based on this expected overlap in the radio environments observable by the computing device 20 and the AV 30, the radio environment observable by the AV 30 and documented by the first radio environment signature and the radio environment observable by the computing device 20 and documented by the second radio environment signature should be at least similar. Thus, validation of the activity of the AV 30 may comprise determining whether the first radio environment signature and the second radio environment signature satisfy similarity criteria.

In various embodiments, determining whether the first and second radio environment signatures satisfy the similarity criteria may comprise determining whether the first radio environment signature and the second radio environment signature include an identifier for a commonly observed access point and/or emitting device. As used herein, a commonly observed access point and/or emitting device is an access point or emitting device that was observed by both the AV 30 and the computing entity 20, as indicated by the first and second radio environment signatures. In an example embodiment, determining whether the first and second radio environment signatures satisfy the similarity criteria may comprise determining whether the first radio environment signature and the second radio environment signature include parameters (e.g., signal strength, timing parameters, path loss parameters, beamforming characteristics, and/or the like) for a commonly observed access point and/or emitting device that are the same and/or consistent with one another. For example, if both the first and second radio environment signatures includes parameters for a commonly observed 5G emitting device indicating beamforming characteristics corresponding to a dominant main lobe and minimal side lobes, the first and second radio environment signatures may be consistent with respect to the commonly observed 5G emitting device. In another example, if the first radio environment signature includes parameters for a commonly observed 5G emitting device indicating beaming characteristics corresponding to a dominant main lobe and minimal side lobes and the second radio environment signature includes parameters for the commonly observed 5G emitting device indicating beam forming characteristics corresponding to a main lobe and significant side lobes, the first and second radio environment signatures may be considered inconsistent with respect to the commonly observed 5G emitting device. Various similarity criteria may be used in various embodiments as appropriate for the application and/or format and/or content of the first and second radio environment signatures.

Responsive to determining that the first and second radio environment signatures satisfy the similarity criteria, a validation data object is generated. In an example embodiment, determining whether the first and second radio environment signatures satisfy the similarity requirement includes a negotiation between the AV 30 and the computing device 20 and the result of the negotiation is the validation data object and/or a proximity validated radio environment signature that may include information/data extracted and/or provided by both of the first and second radio environment signatures. In an example embodiment, the proximity validated radio environment may be one of the first radio environment signature or the second radio environment signature. In an example embodiment, the validation data object comprises the proximity validated radio environment signature and/or a version of the proximity validated radio environment signature that has been cryptographically signed using a cryptographic (private) certificate or key that uniquely identifies and/or is securely associated with the AV 30 or the computing device 20. In an example embodiment, the validation data object comprises metadata associated with the first radio environment signature and/or the second radio environment signature and a confirmation that the first and second radio environment signatures satisfied the similarity criteria.

In various embodiments, the validation data object is stored in a validation database (e.g., in memory 14). In various embodiments, the validation database may be indexed by AV identifiers, computing device identifiers, item identifiers (e.g., identifying an item being picked up and/or delivered by an AV), geographic location, date and/or time, and/or the like. In an example embodiment, the validation database is a central database. In an example embodiment, the validation database is a distributed database (e.g., a blockchain ledger and/or the like). In various embodiments, the validation data object may be accessed from the validation database to perform validation, confirmation, and/or substantiation of AV activity.

A. Example Operation of an Aerial Vehicle (AV) to Provide a First Radio Environment Signature FIG. 3 provides a flowchart illustrating various processes, procedures, operations, and/or the like performed, for example, by an AV 30 to provide a first radio environment signature, in accordance with an example embodiment. Starting at block 302, a validation generation trigger is identified. For example, the AV 30 may identify a validation generation trigger. For example, the AV 30 may comprise means, such as processor 32, memory 34, communications interface 36, sensors 39, and/or the like, for identifying a validation generation trigger.

In various embodiments, the validation generation trigger may be identified responsive to an AV 30 being arriving at, leaving, being, and/or performing and/or completing a task (e.g., delivery, pickup, and/or the like) at a planned location and/or at a planned time. For example, an AV 30 may determine (e.g., based on signals from one or more sensors 39) that the AV 30 is located at (e.g., has arrived, is performing the pickup and/or delivery, is preparing to leave the location, and/or the like) and/or within a threshold distance of a pickup location and/or delivery location for a pickup and/or delivery that the AV 30 is scheduled to perform and, responsive to that determination, identify a validation generation trigger. In various embodiments, the location of the AV 30 may be determined based on location sensor measurements captured by sensors 39, visual positioning techniques, radio positioning techniques, various other positioning techniques that are appropriate for the AV 30 location, and/or combinations thereof. In another example, a computing device 20 may monitor the radio environment observable to the computing device 20 and, based at least in part on the monitoring, detect the presence of an AV 30 (e.g., detect a signal, such as a 5G signal or other signal, broadcasted and/or transmitted by the AV 30) and the computing device 20 may initiate an interaction with AV 30 which may cause the AV 30 (or the computing device 20) to identify a validation generation trigger. Similarly, the AV 30 could detect the presence of a computing device 20 (e.g., based on monitoring the radio environment observable by the AV 30), which may cause a validation generation trigger to be identified. In an example embodiment, the validation generation trigger may be identified responsive to a clock of the AV 30 reaching a particular time at which an AV activity validation is scheduled. In an example embodiment, a validation generation trigger may be periodically and/or regularly identified (e.g., once every ten minutes, once every half hour, once every hour, and/or the like as appropriate for the application).

At block 304, a validation request may be generated and provided such that a computing device 20 receives the validation request, in an example embodiment. For example, the AV 30 may generate and provide a validation request such that a computing device 20 receives the validation request. For example, the AV 30 may comprise means, such as processor 32, memory 34, communications interface 36, and/or the like, for generating and providing a validation request such that the computing device 20 receives the validation request. In various embodiments, the validation request may be provided by the AV 30 via one or more wired and/or wireless networks 50, via a peer-to-peer communication (e.g., a 5G peer-to-peer communication) and/or the like. In various embodiments, the validation request initiates the interaction between the AV 30 and the computing device 20. For example, the validation request may be a request for the computing device 20 to generate a second radio environment signature, generate a validation data object, and/or the like.

As noted above, in an example embodiment, the computing device 20 may detect the presence of the AV 30 and initiate the interaction between the AV 30 and the computing device 20. In such an embodiment, the AV 30 may not generate and provide a validation request. For example, in various embodiments, the computing device 20 may identify the validation generation trigger and generate and provide a validation request to the AV 30; a network device 10 may identify the validation generation trigger and generate and provide a validation request to the computing device 20 and/or AV 30; the AV 30 (or computing device 20) may identify the validation generation trigger, generate the first (or second) radio environment signature, and provide the first (or second) radio environment signature to the computing device 20 (or AV 30) to cause the computing device 20 (or AV 30) to generate the second (or first) radio environment signature; and/or the like.

At block 306, a first radio environment signature may be generated. For example, the AV 30 may generate a first radio environment signature. For example, the AV 30 may comprise means, such as processor 32, memory 34, sensors 39, and/or the like for generating the first radio environment signature. For example, sensors 39 may capture one or more measurements regarding radio frequency signals observed by the sensors 39. The one or more measurements may then be aggregated (e.g., by the processor 32) to form the first radio environment signature. As described above, the first radio environment signature may include information/data corresponding to one or more observed access points and/or emitting devices observed by the AV 30 and/or information/data corresponding to signals generated by the one or more observed access points and/or emitting devices that were observed by the AV 30. The first radio environment signature may further comprise and/or be associated with metadata.

In various embodiments, the first radio environment signature may be associated with metadata comprising information/data identifying the AV (e.g., an AV identifier), a timestamp corresponding to when the first radio environment signature was generated and/or captured, a location at which the first radio environment signature was generated and/or captured (e.g., a latitude, longitude, and/or elevation; a street address; an indication that the location is a delivery location or pickup location for a particular item; a location given by a local coordinate system (e.g., a coordinate system associated with a building or venue where the location is located); and/or the like), an activity type indicator for the location (e.g., delivery, pickup, passing through), an entity associated with the location (e.g., an entity that is receiving an item being delivered at the location or that is sending an item being picked up at the location), and/or the like.

In various embodiments, a first radio environment signature may comprise information/data regarding one or more observed access points and/or emitting devices. For example, in various embodiments, a first radio environment signature may comprise information/data regarding one or more observed 5G access points and/or 5G emitting devices. In various embodiments, the observed access point(s) and/or emitting device(s) may transmit and/or broadcast signals and/or communications via one or more radio wavelength communication protocols. In an example embodiment, the first radio environment signature may comprise a complete description of the 5G environment observed by the AV 30. For example, the first radio environment signature may include a list of each 5G access point and/or emitting device observed by the AV 30. In various embodiments, the first radio environment signature may include information/data identifying at least one 5G access point and/or emitting device observed by the AV, information regarding detected and/or emitted beamforming characteristics of at least one 5G access point and/or emitting device observed by the AV, information regarding one or more 5G peer-to-peer communications received and/or transmitted by the AV, and/or information regarding the full 5G environment observed by the AV (e.g., information regarding every 5G signal observed by the AV while the AV is located at the location where the first radio environment signature is being generated). In an example embodiment, the first radio environment signature may comprise information/data regarding a 5G signal generated, transmitted, and/or broadcasted (e.g., a peer-to-peer communication, beacon signal, and/or the like) by the computing device 20 and observed by the AV 30.

In various embodiments, the first radio environment signature may include information regarding various radio environments observable to the AV 30. For example, the first radio environment signature may comprise information/data identifying one or more observed access points and/or emitting devices that are cellular network cells. For example, the first radio environment signature may include global and/or local identifiers configured to identify the one or more access points and/or emitting devices observed by the AV 30 and, possibly, a signal strength and/or pathloss estimate for an observed signal generated and/or transmitted by a respective access point and/or emitting device; timing measurements such as one way and/or round trip timing values, timing advance, and/or other timing measurements for an observed signal generated and/or transmitted by a respective access point and/or emitting device; and/or the like. For example, the first radio environment signature may comprise information/data identifying one or more wireless local area network (WLAN) access points and/or emitting devices observed by the AV 30. For example, the first radio environment signature may include basic service set identifiers (BSSIDs) and/or media access control addresses (MAC addresses) configured to identify the one or more access points and/or emitting devices observed and, possibly, a service set identifiers (SSID) configured to identify a respective access point and/or emitting device; a signal strength measurement such as received signal strength index, a physical power (e.g., Rx) level in dBm, and/or other signal strength measurement and/or pathloss estimate for an observed signal generated and/or transmitted by a respective access point and/or emitting device; timing measurements such as one way and/or round trip timing values, timing advance, and/or other timing measurements for an observed signal generated and/or transmitted by a respective access point and/or emitting device; and/or the like.

At block 308, the first radio environment signature is provided. For example, the AV 30 may provide the first radio environment signature. For example, the AV 30 may comprise means, such as processor 32, memory 34, communications interface 36, and/or the like for providing the first radio environment signature. For example, the AV 30 may provide the first radio environment signature to the processor 32, in an example embodiment. In another example, in various embodiments, the AV 30 may provide at least a portion of the first radio environment signature via one or more wired and/or wireless networks 50 and/or via peer-to-peer communication (e.g., 5G peer-to-peer communication) such that the computing device 20 receives the first environment signature. In another example, in various embodiments, the AV 30 may provide at least a portion of the first radio environment signature via one or more wired and/or wireless networks 50 such that the network device 10 receives the first radio environment signature.

B. Example Operation of a Computing Device to Provide a Second Radio Environment Signature FIG. 4 provides a flowchart illustrating various processes, procedures, operations, and/or the like performed, for example, by a computing device 20 to provide a second radio environment signature, in accordance with an example embodiment. Starting at block 402, a validation generation request is received, in an example embodiment. For example, the computing device 20 may receive a validation generation request. For example, the computing device 20 may comprise means, such as processor 22, memory 24, communications interface 26, sensors 29, and/or the like, for receiving a validation generation request. For example, the validation generation request may be generated and provided by an AV 30 responsive to determining that a validation generation trigger has been identified. In an example embodiment, the validation generation request is generated and provided by a network device 10 based on a planned time for a delivery and/or pickup associated with the computing device 20 and to be performed by an AV 30. In various embodiments, the validation generation trigger initiates an interaction between the computing device 20 and the AV 30. In an example embodiment, the interaction occurs via peer-to-peer communications (e.g., 5G peer-to-peer communications) and/or one or more wired and/or wireless networks 50. In an example embodiment, the computing device 20 may monitor the radio environment observable to the computing device 20 (e.g., via sensors 29) and/or otherwise monitor the environment about the computing device 20 and determine that the AV 30 is located in the vicinity of the computing device 20 (e.g., the computing device 20 may observe a signal transmitted and/or broadcasted by the AV 30) and based thereon the computing device 20 may initiate the interaction between the computing device 20 and the AV 30. For example, in such an example embodiment, the computing device 20 may generate and provide the validation generation request such that the AV 30 receives the validation generation request and, responsive thereto, determines that a validation generation trigger has been identified. For example, in an example embodiment, the computing device 20 may identify the validation generation trigger and generate the second radio environment signature responsive thereto. In an example embodiment, the computing device 20 may identify the validation generation trigger and generate and provide a validation generation request to the AV 30.

At block 404, a second radio environment signature is generated. In an example embodiment, the second radio environment signature is generated responsive to the initiation of the interaction between the AV 30 and the computing device 20. For example, the generation of the second radio environment may be generated as part of the interaction between the AV 30 and the computing device 20. For example, the second radio environment signature may be generated responsive to the computing device 20 receiving and/or processing the validation generation request and/or the computing device 20 identifying that the AV 30 is located in the vicinity of the computing device 20. For example, the computing device 20 may generate a second radio environment signature. For example, the computing device 20 may comprise means, such as processor 22, memory 24, sensors 29, and/or the like for generating the second radio environment signature. For example, sensors 29 may capture one or more measurements regarding radio frequency signals observed by the sensors 29. The one or more measurements may then be aggregated (e.g., by the processor 22) to form the second radio environment signature. As described above, the second radio environment signature may include information/data corresponding to one or more observed access points and/or emitting devices observed by the computing device 20 and/or information/data corresponding to signals generated by the one or more observed access points and/or emitting devices that were observed by the computing device 20. The second radio environment signature may further comprise and/or be associated with metadata.

In various embodiments, the second radio environment signature may be associated with metadata comprising information/data identifying the computing device 20 (e.g., a computing device identifier), a timestamp corresponding to when the second radio environment signature was generated and/or captured, a location at which the second radio environment signature was generated and/or captured (e.g., a latitude, longitude, and/or elevation; a street address; an indication that the location is a delivery location or pickup location for a particular item; a location given by a local coordinate system (e.g., a coordinate system associated with a building or venue where the location is located); and/or the like), an entity associated with the location and/or the computing device (e.g., an entity operates the computing device 20 and/or on whose behalf the computing device 20 is operated), and/or the like.

Similar to the first radio environment signature, a second radio environment signature may comprise information/data regarding one or more observed 5G access points and/or emitting devices. In an example embodiment, the second radio environment signature may comprise a complete description of the 5G environment observed by the computing device 20. For example, the second radio environment signature may include a list of each 5G access point and/or emitting device observed by the computing device 20. In various embodiments, the second radio environment signature may include information/data identifying at least one 5G access point and/or emitting device observed by the computing device 20, information regarding detected and/or emitted beamforming characteristics of at least one 5G access point and/or emitting device observed by the computing device 20, information regarding one or more 5G peer-to-peer communications received and/or transmitted by the computing device 20, and/or information regarding the full 5G environment observed by the computing device 20 (e.g., information regarding every 5G signal observed by the computing device while the AV is located at the location where the first radio environment signature is being generated). In an example embodiment, the second radio environment signature may comprise information/data regarding a 5G signal generated, transmitted, and/or broadcasted (e.g., a peer-to-peer communication, beacon signal, and/or the like) by the AV 30 and observed by the computing device 20.

In various embodiments, the second radio environment signature may include information regarding various radio environments observable to the computing device 20. For example, the second radio environment signature may comprise information/data identifying one or more observed access points and/or emitting devices that are cellular network cells. For example, the second radio environment signature may include global and/or local identifiers configured to identify the one or more access points and/or emitting devices observed and, possibly, a signal strength and/or pathloss estimate for an observed signal generated and/or transmitted by a respective access point and/or emitting device; timing measurements such as one way and/or round trip timing values, timing advance, and/or other timing measurements for an observed signal generated and/or transmitted by a respective access point and/or emitting device; and/or the like. For example, the second radio environment signature may comprise information/data identifying one or more wireless local area network (WLAN) access points and/or emitting devices observed by the computing device 20. For example, the second radio environment signature may include basic service set identifiers (BSSIDs) and/or media access control addresses (MAC addresses) configured to identify the one or more access points and/or emitting devices observed and, possibly, a service set identifiers (SSID) configured to identify a respective access point and/or emitting device; a signal strength measurement such as received signal strength index, a physical power (e.g., Rx) level in dBm, and/or other signal strength measurement and/or pathloss estimate for an observed signal generated and/or transmitted by a respective access point and/or emitting device; timing measurements such as one way and/or round trip timing values, timing advance, and/or other timing measurements for an observed signal generated and/or transmitted by a respective access point and/or emitting device; and/or the like.

At block 406, the second radio environment signature is provided. For example, the computing device 20 may provide the first radio environment signature. For example, the computing device 20 may comprise means, such as processor 22, memory 24, communications interface 26, and/or the like for providing the second radio environment signature. For example, the computing device 20 may provide the second radio environment signature to the processor 22, in an example embodiment. In another example, in various embodiments, the computing device 20 may provide at least a portion of the second radio environment signature via one or more wired and/or wireless networks 50 and/or via peer-to-peer communication (e.g., 5G peer-to-peer communication) such that the AV 30 receives the second environment signature. In another example, in various embodiments, the computing device 20 may provide at least a portion of the second radio environment signature via one or more wired and/or wireless networks 50 such that the network device 10 receives the second radio environment signature.

C. Example Generation of a Validation Data Object

In various embodiments, an AV 30, a computing device 20, and/or a network device 10 may generate a validation data object. In an example embodiment, both the AV 30 and the computing device 20 may generate validation data objects for the same interaction. In various embodiments, the validation data object is generated based on and/or responsive to receiving at least portions of each of the first radio environment signature and the second radio environment signature and determining that the at least portions of the first and second radio environment signatures satisfy a similarity criteria. In an example embodiment, responsive to determining that the at least portions of the first and second radio environment signatures satisfy the similarity criteria, a proximity validated radio environment signature may be generated. In an example embodiment, one of the first radio environment signature or the second radio environment signature is selected as the proximity validated radio environment signature. In an example embodiment, the AV 30 and computing device 20 may conduct a negotiation, discussion, exchange multiple communications (e.g., via one or more wired and/or wireless networks 50 and/or via peer-to-peer communication (e.g., 5G peer-to-peer communication)) and/or the like to generate a proximity validated radio environment signature based on both the first and second radio environment signatures as part of determining whether the first and second radio environment signatures satisfy the similarity criteria. In an example embodiment, a network device 10 may extract components from each of the first and second radio environment signatures and generate a proximity validated radio environment signature comprising the components from both of the first and second radio environment signature. In an example embodiment, the validation data object is the proximity validated radio environment signature and/or a cryptographically and/or securely signed proximity validated radio environment signature. In an example embodiment, a proximity validated radio environment signature need not be generated and the validation data object is an indication that the first and second radio environment signatures satisfied the similarity criteria. For example, the validation data object may be a verification message verifying the location of the AV at the time associated with at least one of the first radio environment signature or the second radio environment signature. The validation data object may be provided and/or stored for future use in validating, confirming, and/or substantiating the activity of the AV.

FIG. 5 provides a flowchart illustrating various processes, procedures, operations, and/or the like that may be performed by the AV 30, computing device 20, and/or network device 10 to generate and provide and/or store a validation data object corresponding to activity of the AV 30. Starting at block 502, a validation generation trigger may be generated and/or provided. For example, the AV 30, computing device 20, and/or network device 10 may generate and/or provide a validation generation trigger. For example, the AV 30, computing device 20, and/or network device 10 may comprise means, such as processor 12, 22, 32, memory 14, 24, 34, communications interface 16, 26, 36, sensors 29, 39, and/or the like, for generating and/or providing a validation generation trigger. For example, it may be determined (e.g., based on signals from one or more sensors 39) that the AV 30 is located at (e.g., has arrived, is performing the pickup and/or delivery, is preparing to leave the location, and/or the like) and/or within a threshold distance of a pickup location and/or delivery location for a pickup and/or delivery that the AV 30 is scheduled to perform and, responsive to that determination, a validation generation trigger may be generated and provided such that the first and second radio environment signatures are generated by the respective ones of the AV 30 and the computing device 20. In another example, it may be determined that, via monitoring the radio environment observable to the computing device 20, the computing device 20 has observed the AV 30 and/or otherwise detected the presence of the AV 30 (e.g., detected a signal, such as a 5G signal or other signal, broadcasted and/or transmitted by the AV 30) and responsive thereto a validation generation trigger may be generated and provided such that the first and second radio environment signatures are generated by the respective ones of the AV 30 and the computing device 20. Similarly, it may be determined that the AV 30, via monitoring the radio environment observable to the AV 30, has observed and/or detected the presence of a computing device 20 (e.g., detected a signal, such as a 5G signal or other signal, broadcasted and/or transmitted by the AV 30) and responsive thereto a validation generation trigger may be generated and provided such that the first and second radio environment signatures are generated by the respective ones of the AV 30 and the computing device 20. In an example embodiment, the validation generation trigger may be generated and/or provided responsive to a clock of the AV 30, computing device 20, and/or network device 10 reaching a particular time at which an AV activity validation is scheduled. In an example embodiment, a validation generation trigger may be periodically and/or regularly generated and/or provided (e.g., once every ten minutes, once every half hour, once every hour, and/or the like as appropriate for the application).

At block 504, a first radio signature is obtained. For example, the first radio signature may be received and/or accessed. For example, the AV 30, computing device 20, and/or network device 10 my obtain (e.g., receive, accesses, and/or the like) the first radio signature. For example, the AV 30, computing device 20, and/or network device 10 may comprise means, such as processor 12, 22, 32, memory 14, 24, 34, communications interface 16, 26, and/or sensors 39, for obtaining a first radio environment signature. In various embodiments, the first radio environment signature is an aggregation of measurements of the radio environment observable to the AV 30 via sensors 39.

At block 506, a second radio signature is obtained. For example, the second radio signature may be received and/or accessed. For example, the AV 30, computing device 20, and/or network device 10 my obtain (e.g., receive, accesses, and/or the like) the second radio signature. For example, the AV 30, computing device 20, and/or network device 10 may comprise means, such as processor 12, 22, 32, memory 14, 24, 34, communications interface 16, 36, and/or sensors 29, for obtaining a second radio environment signature. In various embodiments, the second radio environment signature is an aggregation of measurements of the radio environment observable to the computing device 20 via sensors 29.

At block 508, it is determined whether the first and second radio environment signatures satisfy a similarity criteria. For example, the AV 30, computing device 20, and/or network device 10 may determine whether the first and second radio environment signatures satisfy a similarity criteria. For example, the AV 30, computing device 20, and/or network device 10 may comprise means, such as processor 12, 24, 34, memory 14, 24, 34, communications interface 26, 36, and/or the like, for determining whether the first and second radio environment signatures satisfy a similarity criteria. In various embodiments, it is expected that when the first and second radio environment signatures were captured, the AV 30 and computing device 20 were near one another and therefore should have observed the same, similar, and/or consistent radio environments. Thus, the similarity criteria may be configured to determine whether the first and second radio environment signatures are the same, similar, and/or consistent with one another. For example, the similarity criteria may be configured to determine whether the first and second radio environment signatures describe the same, similar, and/or consistent radio environments. For example, the similarity criteria may correspond to determining whether the AV and the computing device observed the same access points and/or emitting devices, whether the access points and/or emitting devices observed by both the AV and the computing device were observed with attributes (signal strength, timing parameters, beam forming characteristics, and/or the like) that are consistent, and/or the like. In an example embodiment, a probability that the AV 30 and computing device 20 observed the same and/or overlapping radio environments may be determined. In such an embodiment, when the probability that the AV 30 and the computing device 20 observed the same and/or overlapping radio environments is equal to or greater than a threshold probability (e.g., 99%, 98%, 95%, 90%, 85%, 80%, 75%, and/or the like), it is determined that the similarity criteria is satisfied. When the probability that the AV 30 and the computing device 20 observed the same and/or overlapping radio environments is less than the threshold probability, it is determined that the similarity criteria is not satisfied.

In an example embodiment, the first radio environment signature may include information regarding an observation of the computing device 20 made by the AV 30 and/or the second radio environment signature may include information regarding an observation of the AV 30 made by the computing device 20. For example, the AV 30 may transmit a radio frequency signal (e.g., a 5G peer-to-peer communication) and the computing device 20 may receive and/or observe the radio frequency signal and include information corresponding thereto in the second radio environment signature. Similarly, the computing device 20 may transmit a radio frequency signal (e.g., a 5G peer-to-peer communication) and the AV 30 may receive and/or observe the radio frequency signal and include information corresponding thereto in the second radio environment signature.

In various embodiments, determining whether the first and second radio environment signatures satisfy the similarity criteria may comprise determining whether the first radio environment signature and the second radio environment signature include an identifier for a commonly observed access point and/or emitting device. As used herein, a commonly observed access point and/or emitting device is an access point or emitting device that was observed by both the AV 30 and the computing entity 20, as indicated by the first and second radio environment signatures. In an example embodiment, determining whether the first and second radio environment signatures satisfy the similarity criteria may comprise determining whether the first radio environment signature and the second radio environment signature include parameters (e.g., signal strength, timing parameters, path loss parameters, beamforming characteristics, and/or the like) for a commonly observed access point and/or emitting device that are the same and/or consistent with one another. For example, if both the first and second radio environment signatures includes parameters for a commonly observed 5G emitting device indicating beamforming characteristics corresponding to a dominant main lobe and minimal side lobes, the first and second radio environment signatures may be consistent with respect to the commonly observed 5G emitting device. For example, if the first and second radio environment signatures do not include any commonly observed access points and/or emitting devices (e.g., there are no access points and/or emitting devices that are identified in both the first radio environment signature and the second radio environment signature) is may be determined to be inconsistent. Various similarity criteria may be used in various embodiments as appropriate for the application and/or format and/or content of the first and second radio environment signatures.

In various embodiments, the AV 30 and computing device 20 conduct a negotiation, discussion, string of communications, and/or the like building a proximity validated radio environment signature that is self-consistent based on the first and second radio environment signatures. For example, if a proximity validated radio environment signature may be generated by combining different portions of the first and second radio environment such that the proximity validated radio environment is self-consistent and consistent with both the first and second radio environment signatures, it may be determined that the first and second radio environment signatures satisfy the similarity criteria.

When and/or if, at block 508, it is determined that the first and second radio environment signatures do not satisfy the similarity criteria, the process continues to block 510. At block 510, an error may be provided. For example, the AV 30, computing device 20, and/or network device 10 may provide an error. For example, the AV 30, computing device 20, and/or network device 10 may comprise means, such as processor 12, 22, 32, memory 14, 24, 34, communications interface 16, 26 36, user interface 18, 28, and/or the like, for providing an error. In an example embodiment, the error may trigger the AV 30 to generate a new first radio environment signature and/or the computing device 20 to generate a new second radio environment signature. In an example embodiment, the error may cause the location of the AV 30 to be determined via one or more different techniques, technologies, and/or the like, cause the AV 30 to return to home base location, and/or the like.

When and/or if, at block 508, it is determined that the first and second radio environment signatures do satisfy the similarity criteria, the process continues to block 512. At block 512, a validation data object is generated. For example, the AV 30, computing device 20, and/or network device 10 may generate a validation data object. For example, the AV 30, computing device 20, and/or network device 10 may comprise means, such as processor 12, 22, 32, memory 14, 24, 34, communications interface 26, 36, and/or the like for generating the validation data object.

As described above, in various embodiments, a proximity validated radio environment signature may be generated by (a) selecting one of the first radio environment signature or the second radio environment signature as the proximity validated radio environment signature (and the corresponding metadata) or (b) generating a hybrid radio environment signature that includes components extracted from first and second radio environment signatures (and the corresponding metadata). In an example embodiment, the validation data object is and/or comprises the proximity validated radio environment signature. In an example embodiment, the AV 30 and/or computing device 20 may cryptographically sign (e.g., using a cryptographic certificate, private signing key, and/or the like) the proximity validated radio environment signature. In an example embodiment, the AV 30 and/or computing device 20 may cryptographically sign the proximity validated radio environment signature using a signature (e.g., a cryptographic certificate, private signing key, and/or the like) that uniquely and/or securely identifies the signing device (e.g., the AV 30 or the computing device 20). In an example embodiment, the validation data object is and/or comprises the signed proximity validated radio environment signature.

In an example embodiment, the validation data object is and/or comprises a verification message indicating, verifying, confirming, and/or substantiating, that the AV 30 was located at a particular location (e.g., as determined based on the first and/or second radio environment signature and a known location of computing device 20 and/or a radio positioning map, as determined based on a location sensor of the AV 30, as determined based on planned delivery and/or pickup location, and/or the like) at a particular time (e.g., the time when the first radio environment was generated). In an example embodiment, the verification message may be cryptographically signed (e.g., using a certificate, private signing key, and/or the like) by the device (e.g., AV 30, computing device 20, and/or network device 10) that generated the verification message. For example, the validation data object may be and/or comprise a signed verification message.

At block 514, the validation data object is provided and/or stored. For example, the AV 30, computing device 20, and/or network device 10 may provide and/or store the validation data object. For example, the AV 30, computing device 20, and/or network device 10 may comprise means, such as processor 12, 22, 32, memory 14, 24, 34, communications interface 16, 26, 36, and/or the like, for providing and/or storing the validation data object. For example, the network device 10 may store (e.g., in memory 14) and/or have access to a validation database. In embodiments where the AV 30 and/or computing device 20 generates the validation data object, the AV 30 and/or computing device 20 may provide the validation data object such that the network device 10 receives the validation data object and stores the validation data object in the validation database. In an example embodiment, the network device 10 generates the validation data object and causes the validation data object to be stored in the validation database. In an example embodiment, the AV 30 and/or computing device 20 may also store a validation database and/or may locally store validation data objects corresponding to interactions of which that device was a party for a period of time (e.g., a day, a week, a month, and/or the like).

D. Example Operation of a Network Device to Validate AV Activity

In various embodiments, the validation data objects stored in the validation database may be used to validate, confirm, and/or substantiate activity of the AV 30. For example, the AV 30 may be scheduled to perform a delivery and/or pick up. The delivery and/or pick up may be scheduled to occur at a delivery location and/or pickup location. In an example embodiment, the delivery and/or pick up is to occur at a delivery and/or pickup time. In various embodiments, the delivery and/or pickup time may be a time range (e.g., a five minute window, a ten minute window, an hour window, a two hour window, a four hour window, and/or the like). In an example embodiment, to perform the delivery and/or pick up at the delivery and/or pickup location in accordance with the delivery and/or pickup time, the AV 30 is expected to be located at a planned location at a planned time. In an example embodiment, the planned location is the delivery and/or pickup location and the planned time is the delivery and/or pickup time. In an example embodiment, the planned location may be an in route location as the AV 30 travels to the delivery and/or pickup location and the planned time may be a time or time range that the AV 30 is expected to be located at the in route location. In order to validate the activity of an AV 30, it may be determined whether a validation data object is stored in the validation database that indicates that the AV 30 was located at the planned location in accordance with the planned time. As should be understood by one of skill in the art, the AV 30 may be performing various tasks and/or operations in addition to and/or instead of delivery and/or pickup of one or more items and that may be associated with a planned location and a planned time.

FIG. 6 provides a flowchart illustrating processes, procedures, operations, and/or the like performed by a network device 10 to validate the activity of an AV 30 based on a validation data object stored in a validation database. For example, the network device 10 may perform an audit of the AV's 30 activity, may receive a request for validation, confirmation, and/or substantiation of a delivery, pickup, and/or the like being performed by the AV 30 (e.g., from computing entity operated by and/or on behalf of an entity that was a party to the delivery, pickup, and/or the like). Starting at block 602, the network device 10 may obtain one or more validation data objects from the validation database. For example, the network device 10 may comprise means, such as processor 12, memory 14, communications interface 16, and/or the like, for obtaining and/or accessing one or more validation data objects from the validation database. For example, the one or more validation data objects obtained may be accessed based on an AV identifier, a delivery and/or pickup identifier, a date and/or time or date and/or time range, a computing device identifier, and/or the like and/or a combination thereof stored in association with the one or more validation data objects (e.g., as metadata associated with and/or as part of the validation data object). For example, in an example embodiment, the one or more validation data objects are identified from the validation database based on a combination of a particular AV identifier, a particular computing device identifier, and a date and/or time.

Based on the one or more validation data objects accessed and/or obtained from the validation database, the network device 10 may determine that the AV 30 was located at a particular location at a particular time, at block 604. For example, the network device 10 may comprise means, such as processor 12, memory 14, and/or the like for determining, based on the one or more accessed and/or obtained validation data objects, that the AV 30 was located at a particular location at a particular time. For example, based on a location and timestamp indicated by at least one of the one or more accessed and/or obtained validation data objects, it may be determined that the AV 30 was located at a particular location at a particular time.

At block 606, it may be determined whether the particular location is in accordance with the planned location and whether the particular time is in accordance with the planned time. For example, the network device 10 may determine whether the particular location is in accordance with the planned location and the particular time is in accordance with the planned time. For example, the network device 10 may comprise means, such as processor 12, memory 14, and/or the like, for determining whether the particular location is in accordance with the planned location and whether the particular time is in accordance with the planned time. For example, when it is determined that the particular location is the planned location (and/or within a predefined radius and/or geofence of the planned location), it may be determined whether the particular time is in accordance with the planned location. For example, when it is determined that the particular location is not the planned location, it may be determined (e.g., based on map data accessed from geographic database stored in memory 14) whether it is possible, plausible, and/or expected that the AV 30 was located at the planned location at the planned time given that the AV 30 was located at the particular location at the particular time. For example, it may be determined whether the particular location is enroute to the planned location or between first planned location and a second planned location. For example, if the particular location is determined to be a location along the AV's 30 route to the planned location, it may be determined whether the expected travel time between the particular location and the planned location would allow for AV 30 to travel from the particular location to the planned location such that the AV 30 arrives at the planned location at and/or during the planned time. In an example embodiment, when it is determined that the particular location is not the planned location, and it is possible, plausible, and/or expected that the AV 30 was located at the planned location at the planned time given that the AV 30 was located at the particular location at the particular time, it may be determined that the particular location and particular time are in accordance with the planned location and planned time. In an example embodiment, a time-ordered sequence of data validation objects may be considered to determine a time-ordered sequence of particular positions that may be analyzed to determine whether the time-ordered sequence of particular positions is consistent with the AV 30 being located at the planned location at the planned time.

When and/or if, at block 606, it is determined that the particular location and the particular time are in accordance with the AV 30 being located at the planned location at the planned time, the process continues to block 608. At block 608, a confirmation that the AV 30 was located at the planned location at the planned time is provided. For example, the network device 10 may provide a confirmation that the AV 30 was located at the planned location at the planned time. For example, the network device 10 may comprise means, such as processor 12, memory 14, communications interface 16, user interface 18, and/or the like, for providing a confirmation that the AV 30 was located at the planned location at the planned time. For example, if the validation of the AV's 30 activity was performed as part of an audit of the AV's activity, the confirmation may be provided (e.g., via the processor 12, communications interface 16, and/or user interface 18) to the human auditor and/or to a computer program and/or application that is performing the audit. When a request for validation, confirmation, and/or substantiation of a delivery, pickup, and/or the like being performed by the AV 30 is received from a computing entity operated by and/or on behalf of an entity that was a party to the delivery, pickup, and/or the like, the confirmation may be provided (e.g., via the communications interface 16) to the computing entity and/or an electronic address associated with the entity that submitted the request.

When and/or if, at block 606, it is determined that the AV's activity cannot be validated, confirmed, and/or substantiated, the process continues to block 610. In various embodiments, it may be determined that the AV's activity cannot be validated, confirmed, and/or substantiated because a validation data object that indicates the AV 30 was located at the planned location at the planned time does not exist. In various embodiments, I may be determined that the AV's activity cannot be validated, confirmed, and/or substantied because a validation data object that shows the AV 30 was not located at the planned location at the planned time exists. At block 610, an error may be provided. For example, the network device 10 may provide an error. For example, the network device 10 may comprise means, such as processor 12, memory 14, communications interface 16, user interface 18, and/or the like for providing an error. In an example embodiment, the error may be a communication indicating that the activity of the AV 30 cannot be validated, confirmed, and/or substantiated based on the content of the validation database.

III. Technical Advantages

Various embodiments provide technical solutions to the technical problems of accurately and reliably validating, confirming, and/or substantiating AV activity. For example, conventional techniques for validating the location and/or activity of AVs are susceptible to being spoofed and/or other various attacks. Various embodiments of the present invention provide a technical solution to the technical problem of AV activity validation, confirmation, and/or substantiation by using a data artifact (e.g., a validation data object) generated responsive to an interaction between an AV 30 and a computing device 20 to validate, confirm, and/or substantiate AV activity. For example, if the location of the computing device 20 is known (e.g., the computing device 20 is located at a delivery and/or pickup location) and the AV 30 observes the same and/or a similar radio environment as the computing device 20, then the AV 30 is located in the vicinity of the known computing device location. Even if one or more of the access points and/or emitting devices observed by the computing device 20 and the AV 30 are spoofed, the fact that the AV 30 and the computing device 20 observe the same and/or similar radio environments locates the computing device 20 and the AV 30 near one another. In other words, the validity of the access points is immaterial because it is the overlap between the access points and/or emitting devices observed by both the AV 30 and the computing device 20 that is considered. Thus, the interaction between the computing device 20 and the AV 30 reliably and accurately locates the AV 30 in the vicinity of the computing device 20 and provides a data artifact (e.g., the validation data object) that may be stored for future reference and/or future validation tasks. Thus, various embodiments provide a technical solution to a technical problems specifically arising in the use of AV's 30 to perform various tasks and how to reliably and accurately validate, confirm, and/or substantiate the AV's completion of these tasks.

IV. Example Apparatus

The network device 10 and/or computing device 20 of an example embodiment may be embodied by or associated with a variety of computing devices including, for example, a navigation system including a global navigation satellite system (GNSS), a cellular telephone, a mobile phone, a personal digital assistant (PDA), a watch, a camera, a computer, an Internet of things (IoT) item, and/or other device that can observe the radio environment (e.g., the 5G environment) in the vicinity of the computing device and/or that can store a validation database. Additionally or alternatively, the network device 10 and/or computing device 20 may be embodied in other types of computing devices, such as a server, a personal computer, a computer workstation, a laptop computer, a plurality of networked computing devices or the like, that are configured to interact with an AV 30, generate a validation data object, store a validation object, use a validation object to perform a validation of AV activity, and/or the like. In an example embodiment, a computing device 20 is a smartphone, tablet, other mobile device, an edge device, and/or other 5G enabled device and a network device 10 is a server. In an example embodiment, an AV 30 is an unmanned, autonomous, semi-autonomous, and/or other aerial vehicle that may be programed and/or controlled to perform various tasks, such as item delivery and/or pickup.

In some embodiments, the processor 12, 22, 32 (and/or co-processors or any other processing circuitry assisting or otherwise associated with the processor) may be in communication with the memory device 14, 24, 34 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network device 10 and/or computing device 20 may be embodied by a computing entity and/or device and an AV 30 may comprise a computing entity and/or device (e.g., in addition to mechanical systems used for aerial navigation, item transportation, and/or the like). However, in some embodiments, the network device 10, computing device 20, and/or the computing entity and/or device of the AV 30 may be embodied as a chip or chip set. In other words, the network device 10, computing device 20, and/or AV 30 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22, 32 may be embodied in a number of different ways. For example, the processor 12, 22, 32 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22. 32 may include one or more processing cores configured to perform independently. A multi-core processor may enable multiprocessing within a single physical package. Additionally or alternatively, the processor 12, 22, 32 may include one or more processors configured in tandem via the bus to enable independent execution of instructions, pipelining and/or multithreading.

In an example embodiment, the processor 12, 22, 32 may be configured to execute instructions stored in the memory device 14, 24, 34 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network device 10, computing device 20, and/or AV 30 may include a user interface 18, 28, 38 that may, in turn, be in communication with the processor 12, 22, 32 to provide output to the user, such as one or more navigable routes to and/or from a planned location (e.g., a delivery location and/or a pickup location), one or more validations, confirmations, and/or substantiations of AV activity, and/or the like, and, in some embodiments, to receive an indication of a user input. As such, the user interface 18, 28, 38 may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22, 32 (e.g., memory device 14, 24, 34 and/or the like).

The network device 10, computing device 20, and/or AV 30 may optionally include a communication interface 16, 26, 36. The communication interface 16, 26, 36 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In various embodiments, a network device 10, computing device 20, and/or AV 30 may comprise a component (e.g., memory 14, 24, 34, and/or another component) that stores a digital map (e.g., in the form of a geographic database) comprising a first plurality of data records, each of the first plurality of data records representing a corresponding TME, wherein at least some of said first plurality of data records map information/data indicating current traffic conditions along the corresponding TME. For example, the geographic database may include a variety of data (e.g., map information/data) utilized in various navigation functions such as constructing a route or navigation path, determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment, segment, link, lane segment, or traversable map element (TME) data records, point of interest (POI) data records, localization feature data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, and/or other data records. In an example embodiment, the network device 10 may be configured to modify, update, and/or the like one or more data records of the geographic database. For example, the network device 10 may modify, update, generate, and/or the like map information/data corresponding to TMEs, links, lanes, road segments, travel lanes of road segments, nodes, intersection, pedestrian walkways, elevators, staircases, and/or the like and/or the corresponding data records (e.g., to add or update updated map information/data including, for example, current traffic conditions along a corresponding TME), a localization layer (e.g., comprising localization features) and/or the corresponding data records, and/or the like.

In an example embodiment, the TME data records are links, lanes, or segments (e.g., maneuvers of a maneuver graph, representing roads, travel lanes of roads, streets, paths, navigable aerial route segments, and/or the like as can be used in the calculated route or recorded route information for determination of one or more personalized routes). The intersection data records are ending points corresponding to the respective links, lanes, or segments of the TME data records. The TME data records and the intersection data records represent a road network, such as used by vehicles, cars, bicycles, and/or other entities. Alternatively, the geographic database can contain path segment and intersection data records or nodes and connection information/data or other data that represent pedestrian paths or areas in addition to or instead of the vehicle road record data, for example. Alternatively and/or additionally, the geographic database can contain navigable aerial route segments or nodes and connection information/data or other data that represent an navigable aerial network, for example.

The TMEs, lane/road/link/path segments, segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a network device 10, computing device 20, and/or AV 30 in accordance with an example embodiment may determine the time to traverse a route through at least a portion of a navigable network.

V. Apparatus, Methods, and Computer Program Products

As described above, FIGS. 3, 4, 5, and 6 illustrate flowcharts of a network device 10, computing device 20, and/or AV 30, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24, 34 of an apparatus employing an embodiment of the present invention and executed by the processor 12, 22, 32 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    obtaining, by one or more processors, at least one validation data object, wherein the at least one validation data object was automatically generated, and the generation of the at least one validation data object was automatically triggered by an interaction having occurred between an aerial vehicle (AV) and a computing device;
    determining, by the one or more processors and based at least in part on the at least one validation data object, that the AV was located at a particular location at a particular time when the interaction occurred;
    determining, by the one or more processors, whether the particular location and the particular time match a planned location of the AV at a planned time, respectively; and
    responsive to determining that the particular location and the particular time match the planned location of the AV at the planned time, respectively, providing a confirmation that the AV was at the planned location at the planned time.

2. The method of claim 1, wherein the planned location is a delivery location or pickup location and the planned time is a delivery time or a pickup time and the confirmation confirms that the AV performed a delivery or pickup at the delivery or pickup location at the delivery or pickup time.

3. The method of claim 1, wherein the validation data object is generated based on at least one of a first radio environment signature or a second radio environment signature, the first radio environment signature generated by the AV in association with an interaction between the AV and the computing device and the second radio environment signature generated by the computing device in association with the interaction between the AV and the computing device.

4. The method of claim 3, wherein the first radio environment signature and the second radio environment signature each comprise information regarding at least one of:
    at least one 5G access point observed by a corresponding one of the AV and the computing device,
    information regarding detected and/or emitted beamforming characteristics of a 5G access point observed by a corresponding one of the AV and the computing device,
    information regarding one or more 5G peer-to-peer communications received and/or transmitted by a corresponding one of the AV and the computing device, or
    information regarding the full 5G environment observed by a corresponding one of the AV and the computing device.

5. The method of claim 3, wherein the validation data object is at least one of (a) a verification message verifying the location of the AV at the time associated with at least one of the first radio environment signature or the second radio environment signature, (b) a proximity validated radio environment signature or (c) a cryptographically signed proximity validated radio environment signature generated based on at least one of the first radio environment signature or the second radio environment signature.

6. The method of claim 1, wherein the validation data object indicates that the AV was located at a delivery location at a delivery time or at a pickup location at a pickup time.

7. An apparatus comprising:
    at least one processor, at least one memory storing computer program code, and a communications interface, the at least one memory and the computer program code are configured to, with the processor, cause the apparatus to at least:
    obtain at least one validation data object, wherein the at least one validation data object was automatically generated, and the generation of the at least one validation data object was automatically triggered by an interaction having occurred between an aerial vehicle (AV) and a computing device;
    determine, based at least in part on the at least one validation data object, that the AV was located at a particular location at a particular time when the interaction occurred;
    determine whether the particular location and the particular time match a planned location of the AV at a planned time, respectively; and
    responsive to determining that the particular location and the particular time match the planned location of the AV at the planned time, respectively, provide a confirmation that the AV was at the planned location at the planned time.

8. The apparatus of claim 7, wherein the planned location is a delivery location or pickup location and the planned time is a delivery time or a pickup time and the confirmation confirms that the AV performed a delivery or pickup at the delivery or pickup location at the delivery or pickup time.

9. The apparatus of claim 7, wherein the validation data object is generated based on at least one of a first radio environment signature or a second radio environment signature, the first radio environment signature generated by the AV in association with an interaction between the AV and the computing device and the second radio environment signature generated by the computing device in association with the interaction between the AV and the computing device.

10. The apparatus of claim 9, wherein the first radio environment signature and the second radio environment signature each comprise information regarding at least one of:
   at least one 5G access point observed by a corresponding one of the AV and the computing device,
   information regarding detected and/or emitted beamforming characteristics of a 5G access point observed by a corresponding one of the AV and the computing device,
   information regarding one or more 5G peer-to-peer communications received and/or transmitted by a corresponding one of the AV and the computing device, or
   information regarding the full 5G environment observed by a corresponding one of the AV and the computing device.

11. The apparatus of claim 9, wherein the validation data object is at least one of (a) a verification message verifying the location of the AV at the time associated with at least one of the first radio environment signature or the second radio environment signature, (b) a proximity validated radio environment signature or (c) a cryptographically signed proximity validated radio environment signature generated based on at least one of the first radio environment signature or the second radio environment signature.

12. The apparatus of claim 7, wherein the validation data object indicates that the AV was located at a delivery location at a delivery time or at a pickup location at a pickup time.

13. A computer program product comprising at least one non-transitory computer-readable storage medium having computer-readable program code portions stored therein, the computer-readable program code portions comprising executable portions configured, when executed by a processor of an apparatus, to cause the apparatus to:
   obtain at least one validation data object, wherein the at least one validation data object was automatically generated, and the generation of the at least one validation data object was automatically triggered by an interaction having occurred between an aerial vehicle (AV) and a computing device;
   determine, based at least in part on the at least one validation data object, that the AV was located at a particular location at a particular time when the interaction occurred;
   determine whether the particular location and the particular time match a planned location of the AV at a planned time, respectively; and
   responsive to determining that the particular location and the particular time match the planned location of the AV at the planned time, respectively, provide a confirmation that the AV was at the planned location at the planned time.

14. The computer program product of claim 13, wherein the planned location is a delivery location or pickup location and the planned time is a delivery time or a pickup time and the confirmation confirms that the AV performed a delivery or pickup at the delivery or pickup location at the delivery or pickup time.

15. The computer program product of claim 13, wherein the validation data object is generated based on at least one of a first radio environment signature or a second radio environment signature, the first radio environment signature generated by the AV in association with an interaction between the AV and the computing device and the second radio environment signature generated by the computing device in association with the interaction between the AV and the computing device.

16. The computer program product of claim 15, wherein the first radio environment signature and the second radio environment signature each comprise information regarding at least one of:
   at least one 5G access point observed by a corresponding one of the AV and the computing device,
   information regarding detected and/or emitted beamforming characteristics of a 5G access point observed by a corresponding one of the AV and the computing device,
   information regarding one or more 5G peer-to-peer communications received and/or transmitted by a corresponding one of the AV and the computing device, or
   information regarding the full 5G environment observed by a corresponding one of the AV and the computing device.

17. The computer program product of claim 15, wherein the validation data object is at least one of (a) a verification message verifying the location of the AV at the time associated with at least one of the first radio environment signature or the second radio environment signature, (b) a proximity validated radio environment signature or (c) a cryptographically signed proximity validated radio environment signature generated based on at least one of the first radio environment signature or the second radio environment signature.

18. The computer program product of claim 13, wherein the validation data object indicates that the AV was located at a delivery location at a delivery time or at a pickup location at a pickup time.

\* \* \* \* \*